(12) United States Patent
Kitagawa

(10) Patent No.: US 10,682,973 B2
(45) Date of Patent: Jun. 16, 2020

(54) VEHICLE KNEE AIRBAG DEVICE AND KNEE AIRBAG FOLDING METHOD

(71) Applicant: TOYOTA JIDOSHA KABUSHIKI KAISHA, Toyota-shi, Aichi-ken (JP)

(72) Inventor: Yuichi Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/029,236

(22) Filed: Jul. 6, 2018

(65) Prior Publication Data

US 2019/0054883 A1    Feb. 21, 2019

(30) Foreign Application Priority Data

Aug. 21, 2017 (JP) ................................ 2017-158884

(51) Int. Cl.
*B60R 21/206* (2011.01)
*B60R 21/231* (2011.01)
(Continued)

(52) U.S. Cl.
CPC .......... *B60R 21/206* (2013.01); *B60R 21/231* (2013.01); *B60R 21/237* (2013.01);
(Continued)

(58) Field of Classification Search
CPC ........ B60R 21/206; B60R 2021/23386; B60R 21/2338; B60R 2021/0051; B60R 21/237;
(Continued)

(56) References Cited

U.S. PATENT DOCUMENTS 7,578,517 B2 * 8/2009 Fukawatase .......... B60R 21/203
280/730.1
7,604,252 B2 * 10/2009 Heitplatz .............. B60R 21/206
280/729
(Continued)

FOREIGN PATENT DOCUMENTS

JP       2008-126974 A      6/2008
JP       2009006924 A  *    1/2009
(Continued)

OTHER PUBLICATIONS

Machine Translation of JP-2009006924-A (Year: 2009).*
Nov. 2, 2018 Extended European Search Report issued in European Patent Application No. 18189221.7.

*Primary Examiner* — Paul N Dickson
*Assistant Examiner* — Kurtis Nielson
(74) *Attorney, Agent, or Firm* — Oliff PLC

(57) ABSTRACT

A vehicle knee airbag device includes a protruding profile section configuring an instrument panel, a position of the protruding profile section being configured to be further toward a vehicle upper side than knees of a seated occupant; an upright wall section provided adjacent to a vehicle lower side of a lower wall of the protruding profile section; and a knee airbag module including a knee airbag. The knee airbag includes an occupant-side base cloth portion disposed on an occupant-facing side and a non-occupant-side base cloth portion disposed on a non-occupant-facing side of the knee airbag in an inflated and deployed state, the non-occupant-side base cloth portion being disposed adjacent to the upright wall section in the inflated and deployed state of the knee airbag.

9 Claims, 11 Drawing Sheets

(51) Int. Cl.
*B60R 21/237* (2006.01)
*B60R 21/00* (2006.01)
*B60R 21/235* (2006.01)
*B60R 21/2338* (2011.01)

(52) U.S. Cl.
CPC ............... *B60R 2021/0051* (2013.01); *B60R 2021/23169* (2013.01); *B60R 2021/23386* (2013.01); *B60R 2021/23509* (2013.01)

(58) Field of Classification Search
CPC ........ B60R 21/231; B60R 2021/23509; B60R 2021/23169
See application file for complete search history.

(56) References Cited

U.S. PATENT DOCUMENTS

| | | | |
|---|---|---|---|
| 2002/0171230 A1* | 11/2002 | Takimoto | B60R 21/206 280/730.1 |
| 2004/0113399 A1* | 6/2004 | Yoshikawa | B60R 21/206 280/730.1 |
| 2008/0122205 A1 | 5/2008 | Imamura et al. | |
| 2008/0129022 A1 | 6/2008 | Dennis | |
| 2010/0052296 A1 | 3/2010 | Sasaki et al. | |
| 2015/0197210 A1 | 7/2015 | Abe | |
| 2016/0052479 A1 | 2/2016 | Komatsu | |
| 2016/0068131 A1* | 3/2016 | Komatsu | B60R 21/233 280/730.1 |
| 2018/0297550 A1 | 10/2018 | Kitagawa | |

FOREIGN PATENT DOCUMENTS

| | | |
|---|---|---|
| JP | 2014-237382 A | 12/2014 |
| JP | 2015-131524 A | 7/2015 |
| JP | 2016-043855 A | 4/2016 |
| JP | 2016-055728 A | 4/2016 |
| JP | 2018-177041 A | 11/2018 |

* cited by examiner

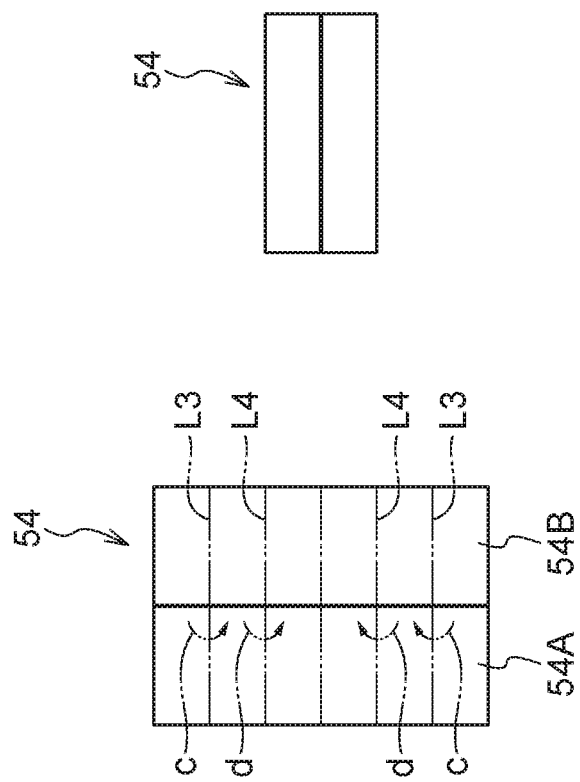

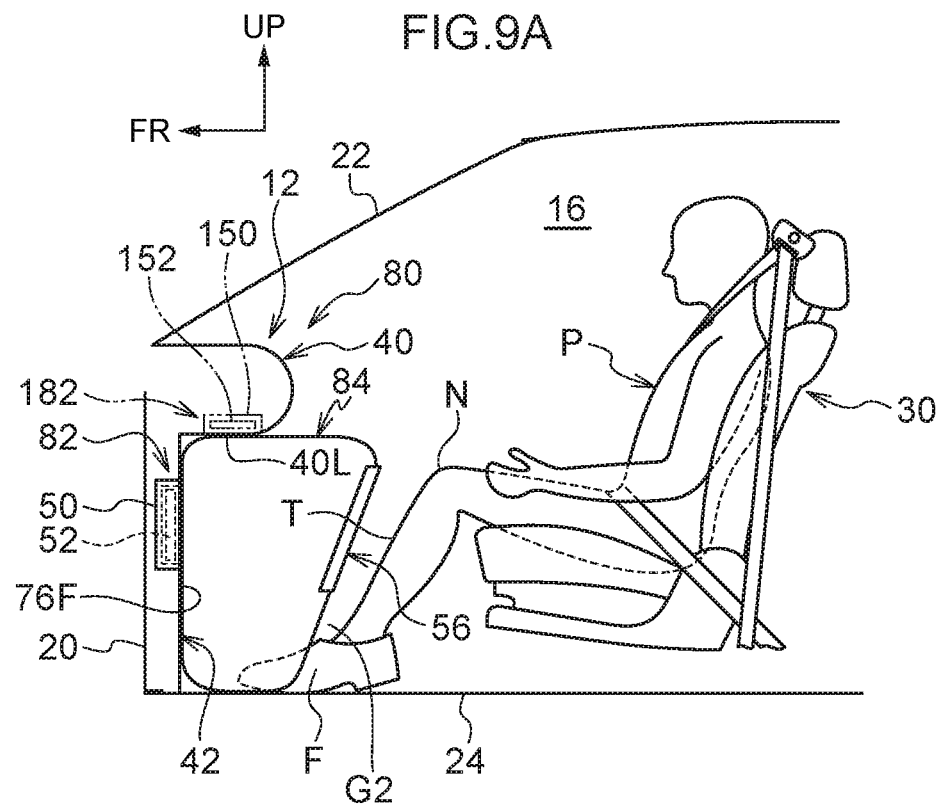
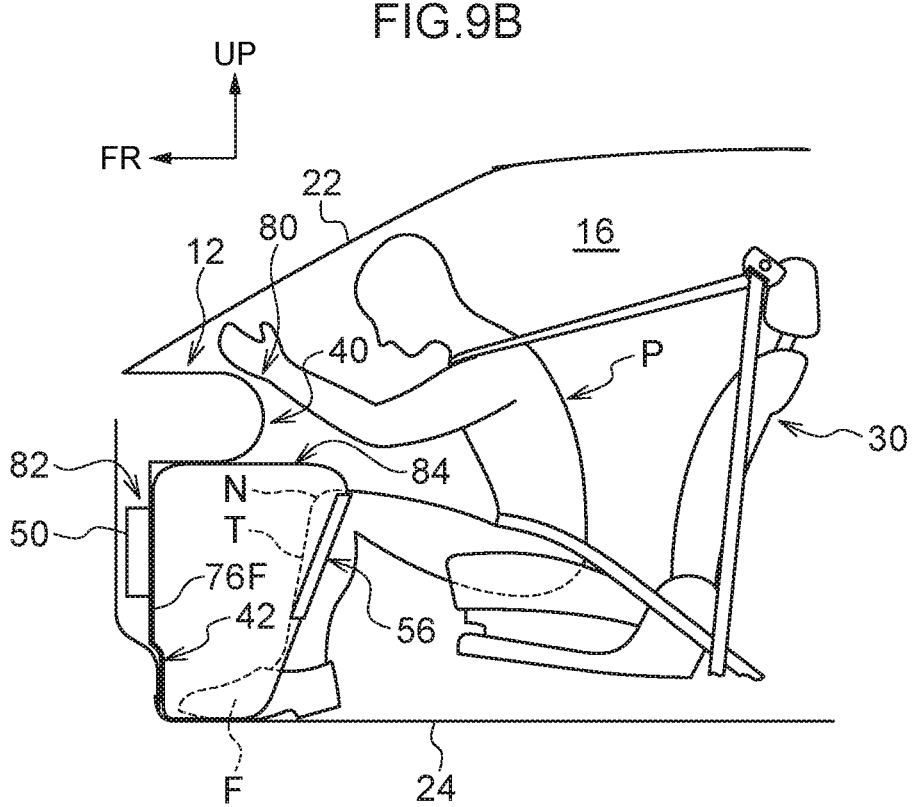

VEHICLE KNEE AIRBAG DEVICE AND KNEE AIRBAG FOLDING METHOD

CROSS-REFERENCE TO RELATED APPLICATION

This application claims priority under 35 USC 119 from Japanese Patent Application No. 2017-158884 filed Aug. 21, 2017, the disclosure of which is incorporated by reference herein in its entirety.

BACKGROUND

Technical Field

Preferred embodiments relate to a vehicle knee airbag device and knee airbag folding method.

Related Art

Airbag devices provided with an airbag to catch knees of a seated occupant in a head-on collision are known (see Japanese Patent Application Laid-Open (JP-A) Nos. 2016-55728, 2008-126974, 2015-131524, 2016-43855, and 2014-237382).

For example, JP-A No. 2016-55728 discloses technology relating to a lower limb protection airbag that inflates so as to cover a front region of the lower limbs of a seated occupant. To explain briefly, according to this publication, in a head-on collision, an airbag inflates toward the knees of a seated occupant from a lower panel side of an instrument panel. In a state in which inflation has completed, a portion of the airbag is interposed between the lower panel or a steering column and the knees or shins of the seated occupant, so as to cover a region from a front region of the knees to a front region of the shins of the seated occupant.

SUMMARY

In JP-A No. 2016-55728, the lower panel of the instrument panel is disposed so as to intrude toward a vehicle cabin inner side from a lower upright wall at a front side of the vehicle cabin, such that the lower panel is configured so as to be at a position comparatively close to a location spanning from the shins to the knees of the seated occupant. However, recently, from the perspective of increasing a space at a location from the knees to a lower side at a front side of an occupant seated in a front seat, consideration is being given to setting a height position of a protruding profile section, where an instrument panel protrudes out toward the vehicle cabin inner side, further toward a vehicle upper side than the knees of the occupant seated in the front seat.

However, supposing the technology of the airbag described above were simply to be applied to a structure in which the instrument panel was changed as described above, were the airbag to be set with a thick thickness after inflation, there would be a possibility of the airbag contacting the knees or the like of the seated occupant during the inflation process. On the other hand, were the airbag to have a thin thickness after inflation, there would be concerns of being unable to adequately protect the knees of the seated occupant. Accordingly, in structures in which a height position of a protruding profile section of an instrument panel is configured to be further toward the vehicle upper side than the knees of an occupant seated in a front seat, there is room for improvement from the perspective of effectively protecting the knees of the seated occupant in a head-on collision.

In consideration of the above circumstances, an object of preferred embodiments is to provide a knee airbag device capable of effectively protecting the knees of a seated occupant in a head-on collision in a structure in which a height position of a protruding profile section of an instrument panel is configured to be further toward a vehicle upper side than the knees of an occupant seated in a front seat, and a folding method for a knee airbag thereof.

A vehicle knee airbag device of a first aspect of the present disclosure includes a protruding profile section, an upright wall section, and a knee airbag module. The protruding profile section is disposed at a front section of a vehicle cabin, and protrudes toward a vehicle cabin inner side so as to configure an instrument panel, a position in a vehicle vertical direction of the protruding profile section is configured to be further toward a vehicle upper side than knees of an occupant seated in a front seat. The upright wall section is provided so as to be adjacent to a vehicle lower side of a lower wall of the protruding profile section, and extends in a vehicle vertical direction and a vehicle width direction. The knee airbag module is installed at a vehicle front side of the upright wall section or at a vehicle upper side of the lower wall of the protruding profile section, and includes a knee airbag which, on receipt of a supply of gas, inflates and deploys to at least a front side of the knees of the occupant seated in the front seat and to a lower side of the protruding profile section. The knee airbag includes an occupant-side base cloth portion that is disposed on an occupant-facing side of the knee airbag in an inflated and deployed state and a non-occupant-side base cloth portion that is disposed on a non-occupant-facing side of the knee airbag in the inflated and deployed state. The non-occupant-side base cloth portion is disposed adjacent to the upright wall section in the inflated and deployed state of the knee airbag. Note that "disposed on a non-occupant-facing side" means being disposed on the opposite side to the occupant-facing side.

According to the above configuration, the protruding profile section configuring the instrument panel is disposed at the front section of the vehicle cabin, and protrudes toward the vehicle cabin inner side. The position in the vehicle vertical direction of the protruding profile section is configured to be further toward the vehicle upper side than the knees of the occupant seated in the front seat. Moreover, the upright wall section is provided so as to be adjacent to and at the vehicle lower side of the lower wall of the protruding profile section, and the upright wall section extends in the vehicle vertical direction and the vehicle width direction. The knee airbag module provided with the knee airbag is installed at the vehicle front side of the upright wall section or at the vehicle upper side of the lower wall of the protruding profile section. On being supplied with gas, the knee airbag inflates and deploys to at least the front side of the knees of the occupant seated in the front seat and to the lower side of the protruding profile section. The knee airbag is configured to include the occupant-side base cloth portion and the non-occupant-side base cloth portion, and the non-occupant-side base cloth portion is disposed adjacent to the upright wall section when inflated and deployed. Note that a space in the front-rear direction between the upright wall section and the knees of the occupant seated in the front seat is wider than a space between the protruding profile section and the knees of the occupant seated in the front seat. Thus, even if a vehicle front-rear direction thickness of the knee airbag is thick after inflation and deployment, it is possible to prevent or suppress the knee airbag from contacting the knees of the occupant seated in the front seat during the inflation and deployment process. Further, since the knee airbag that is thick in vehicle front-rear direction after inflation and deployment bears a reaction force from the upright wall section when restraining the knees of the seated occupant in a head-on collision, the knees of the seated occupant are effectively protected by the knee airbag.

A vehicle knee airbag device of a second aspect of the present disclosure is, in the configuration of the first aspect, wherein the knee airbag includes a pair of bulging portions and a left-right direction intermediate portion. The bulging portions, in vehicle plan view, configure vehicle width direction left and right end sides of the knee airbag in the inflated and deployed state, and bulge out further toward a vehicle rear side than the left-right direction intermediate portion. The pair of bulging portions are inclined such that mutually opposing faces in the vehicle width direction approach one another on progression from respective bulge leading edge sides toward the vehicle front side, and are configured so as to gradually increase respective length toward the vehicle rear side on progression from a lower end side to an upper end side in vehicle side view such that bulge leading edges are inclined toward the vehicle rear side on progression toward the vehicle upper side. Moreover, the knee airbag is further provided with a coupling cloth that couples together the bulge leading edge sides of the pair of bulging portions so as to adopt a state stretched across a range encompassing a position at the front side of the knees of an occupant seated in the front seat, in the inflated and deployed state of the knee airbag.

According to the above configuration, the bulging portions that configure the left and right end sides of the knee airbag when inflated and deployed bulge out further toward the vehicle rear side than the left-right direction intermediate portion of the knee airbag. The bulge leading edge sides of the pair of bulging portions are coupled together by the coupling cloth such that the coupling cloth adopts a state stretched across the range encompassing the position at the front side of the knees of the occupant seated in the front seat when the knee airbag is inflated and deployed. When the knee airbag has inflated and deployed in a head-on collision, the knees of the seated occupant move under inertia toward the vehicle front side and are caught by the coupling cloth, and the knees push the coupling cloth toward the vehicle front side. When this occurs, the pair of bulging portions are pushed toward the vehicle front side while being pulled in toward the left-right direction center due to the pressed coupling cloth. In response thereto, the coupling cloth is gradually displaced toward the vehicle front side, thereby suppressing load from the coupling cloth from acting on the knees.

The pair of bulging portions gradually increase respective length toward the vehicle rear side on progression from a lower end side toward an upper end side, such that the bulge leading edges are inclined toward the vehicle rear side on progression toward the vehicle upper side. Accordingly, a face of the coupling cloth that faces the side of the seated occupant is inclined toward the vehicle rear side on progression toward the vehicle upper side. This makes it easier for the knees of the seated occupant to make contact with the coupling cloth before the shins make contact with the coupling cloth. Further, the pair of bulging portions are inclined such that mutually opposing faces in the vehicle width direction approach one another on progression from respective bulge leading edge sides the vehicle front side. Thus, the left and right knees are guided so as to bring the knees closer together.

A vehicle knee airbag device of a third aspect of the present disclosure is, in the configuration of the second aspect, wherein left and right cloth members are arranged inside the knee airbag, the cloth members coupling a vehicle width direction intermediate portion of the occupant-side base cloth portion to the non-occupant-side base cloth portion in vehicle plan view. Moreover, the cloth members adopt a stretched state extending inclined so as to move away from each other on progression toward the vehicle front side in the inflated and deployed state of the knee airbag.

According to the above configuration, the left and right cloth members couple the left-right direction intermediate portion of the occupant-side base cloth portion to the non-occupant-side base cloth portion. Moreover, the left and right cloth members extend inclined so as to move away from each other on progression toward the vehicle front side in the inflated and deployed state of the knee airbag so as to limit bulging of the left-right direction intermediate portion of the occupant-side base cloth portion toward the vehicle rear side. Thus, when the knee airbag inflates and deploys, the shape of the left-right direction intermediate portion of the knee airbag and the shape of the left and right pair of bulging portions are stably maintained by tension from the left and right cloth members.

A vehicle knee airbag device of a fourth aspect of the present disclosure is, in the configuration of the third aspect, wherein a position in the vehicle vertical direction of the coupling cloth overlaps with a position in the vehicle vertical direction of the cloth members in the inflated and deployed state of the knee airbag.

According to the above configuration, the shape of the inflated and deployed knee airbag can be even more stably maintained due to tension from the coupling cloth and the left and right cloth members acting where the height positions thereof overlap in the vehicle vertical direction when the knee airbag is inflated and deployed.

A vehicle knee airbag device of a fifth aspect of the present disclosure is, in the configuration of any one of the second aspect to the fourth aspect, wherein a lower end in the vehicle vertical direction of the coupling cloth is disposed further toward a vehicle upper side than a vehicle vertical direction lower end of the knee airbag in the inflated and deployed state of the knee airbag.

According to the above configuration, a lower end in the vehicle vertical direction of the coupling cloth is disposed further toward a vehicle upper side than a vehicle vertical direction lower end of the knee airbag when the knee airbag has been inflated and deployed. Accordingly, a gap is formed between the vehicle floor and the lower end of the coupling cloth regardless of the position of the lower end of the knee airbag. Accordingly, the contact amount between the feet of the seated occupant (a portion from the ankles downward) and the coupling cloth in a head-on collision can be reduced or eliminated.

A vehicle knee airbag device of a sixth aspect of the present disclosure is, in the configuration of the fifth aspect, wherein a gap, into which feet of an occupant seated in the front seat are able to enter, is formed between the vehicle vertical direction lower end of the coupling cloth and a vehicle floor in the inflated and deployed state of the knee airbag. Note that reference to "feet" in the sixth aspect indicates a portion from the ankles downward.

According to the above configuration, the feet of the occupant seated in the front seat are able to enter between the vehicle vertical direction lower end of the coupling cloth and the vehicle floor when the knee airbag has been inflated and deployed. This thereby enables contact between the feet of the occupant seated in the front seat and the coupling cloth to be efficiently suppressed in a head-on collision.

A vehicle knee airbag device of a seventh aspect of the present disclosure is, in the configuration of the sixth aspect, wherein the knee airbag is configured to form a gap, into which the feet of an occupant seated in the front seat are able to enter, between the vehicle vertical direction lower end of the knee airbag and the vehicle floor in the inflated and deployed state of the knee airbag. Note that "feet" indicates a portion from the ankles downward.

According to the above configuration, the feet of the occupant seated in the front seat are able to enter between the vehicle vertical direction lower end of the knee airbag and the vehicle floor when the knee airbag has been inflated and deployed. This thereby enables contact between the feet of the occupant seated in the front seat and the knee airbag to be efficiently suppressed in a head-on collision.

A vehicle knee airbag device of an eighth aspect of the present disclosure is, in the configuration of the sixth aspect, wherein the knee airbag is configured to not form a gap between a lower face of the protruding profile section and the vehicle floor in the inflated and deployed state.

According to the above configuration, even when a lower portion of the upright wall section moves back toward the vehicle rear due to collision load in a head-on collision, the knee airbag is interposed between the lower portion of the upright wall section and the feet of the seated occupant. This softens the impact on the feet of the seated occupant compared to cases in which the lower portion of the upright wall section pushes directly on the feet of the seated occupant in a head-on collision.

A vehicle knee airbag device of a ninth aspect of the present disclosure is, in the configuration of any of the second aspect to the seventh aspect, wherein an upper end of the knee airbag inflates and deploys to the vehicle rear side and vehicle upper side of the lower wall of the protruding profile section. Moreover, an upper end of the coupling cloth is deployed at the vehicle rear side and vehicle upper side of the lower wall of the protruding profile section in the inflated and deployed state of the knee airbag.

According to the above configuration, the knees of the seated occupant can be caught by the coupling cloth in a head-on collision in cases in which, for example, the seated occupant has crossed legs, and even when the height position of the knees of the seated occupant is higher than a normal height position when a seated occupant of standard build does not have crossed legs.

In a method of folding the knee airbag of a tenth aspect of the present disclosure, the knee airbag is provided in the knee airbag module that is installed in the vehicle knee airbag device of any one of the second aspect to the ninth aspect. The method includes a first process and a second process. In the first process, as viewed face-on from a side of a seated occupant, left and right end sides of the knee airbag are folded plural times toward a knee airbag left-right direction center at fold lines running along a knee airbag vertical direction such that a side of the knee airbag that faces a seated occupant in the inflated and deployed state of the knee airbag is positioned at an inner side of the folded knee airbag and a left and right pair of folded portions appear side by side at an outer side of the folded knee airbag. In the second process, after the first process, upper and lower end sides of the knee airbag are folded plural times toward a knee airbag vertical direction center at fold lines running along a knee airbag left-right direction such that a side of the knee airbag at which the left and right pair of folded portions appear is positioned at an inner side of the folded knee airbag.

According to the above configuration, in the first process, the left and right end sides of the knee airbag are folded plural times toward the knee airbag left-right direction center at the fold lines running along the knee airbag vertical direction such that the side of the knee airbag that faces a seated occupant in the inflated and deployed state of the knee airbag is positioned at an inner side of the folded knee airbag and a left and right pair of folded portions appear side-by-side at an outer side of the folded knee airbag. Moreover, in the second process, after the first process, the upper and lower end sides of the knee airbag are folded plural times toward the knee airbag vertical direction center at the fold lines running along the knee airbag left-right direction such that the side of the knee airbag at which the left and right pair of folded portions appear is positioned at an inner side of the folded knee airbag. Thus folded, the knee airbag deploys upward and downward in the first half of inflation and deployment in a head-on collision, and then inflates and deploys so as to open out toward the left and right, such that the coupling cloth is stretched in the left-right direction. Thus, even if the knees of the seated occupant were to abut the coupling cloth before inflation and deployment of the knee airbag is complete, since the coupling cloth is not yet taut, any load acting on the knees of the seated occupant can be suppressed to a low amount.

As described above, the vehicle knee airbag device of the first aspect of the present disclosure exhibits the excellent advantageous effect of enabling the knees of a seated occupant to be effectively protected in a head-on collision in a structure in which the height position of a protruding profile section of an instrument panel is configured to be further toward the vehicle upper side than the knees of an occupant seated in a front seat.

The vehicle knee airbag device of the second aspect of the present disclosure exhibits the excellent advantageous effect of catching the knees of a seated occupant with the coupling cloth in a head-on collision, thereby enabling impact to the knees of the seated occupant to be softened, and enabling the left and right knees to be guided so as to bring the knees closer together.

The vehicle knee airbag device of the third aspect of the present disclosure exhibits the excellent advantageous effect of enabling the inflated and deployed shape of the knee airbag to be stably maintained by the left and right cloth members.

The vehicle knee airbag device of the fourth aspect of the present disclosure exhibits the excellent advantageous effect of enabling the inflated and deployed shape of the knee airbag to be even more stably maintained by the coupling cloth and the left and right cloth members.

The vehicle knee airbag device of the fifth aspect of the present disclosure exhibits the excellent advantageous effect of enabling the feet of the occupant seated in the front seat to be suppressed from abutting the coupling cloth in a head-on collision.

The vehicle knee airbag device of the sixth aspect of the present disclosure exhibits the excellent advantageous effect of enabling the feet of the occupant seated in the front seat to be effectively suppressed from being pushed back by the coupling cloth in a head-on collision.

The vehicle knee airbag device of the seventh aspect of the present disclosure exhibits the excellent advantageous effect of enabling the feet of the occupant seated in the front seat to be effectively suppressed from being pushed back by the knee airbag in a head-on collision, and enabling push back by the coupling cloth to be even more effectively suppressed.

The vehicle knee airbag device of the eighth aspect of the present disclosure exhibits the excellent advantageous effect of enabling impact to the feet of a seated occupant to be softened by the knee airbag in a head-on collision.

The vehicle knee airbag device of the ninth aspect of the present disclosure exhibits the excellent advantageous effect of enabling impact to the knees of a seated occupant to be softened in a head-on collision, even in cases in which the height position of the knees of the seated occupant is higher than the normal height position.

The knee airbag folding method of the tenth aspect of the present disclosure exhibits the excellent advantageous effect of enabling load acting on knees of a seated occupant to be suppressed in cases in which the knees of the seated occupant abut the coupling cloth before the folded knee airbag has completed inflation and deployment in a head-on collision.

BRIEF DESCRIPTION OF THE DRAWINGS

Preferred embodiments will be described in detail based on the following figures, wherein:

FIG. 6A is a schematic view for explaining a method of folding the knee airbag in FIG. 3B, and is a plan view in which fold lines along which the knee airbag is folded in a first process are illustrated by double-dotted dashed lines;

FIG. 6B is a plan view illustrating a state on completion of the first process illustrated in FIG. 6A, in which fold lines along which the knee airbag is folded in a second process are illustrated by double-dotted dashed lines;

FIG. 6C is a plan view illustrating a state on completion of the second process illustrated in FIG. 6B;

FIG. 9A is a side view illustrating an inflated and deployed state of a knee airbag of a vehicle knee airbag device according to a second exemplary embodiment of the present invention;

FIG. 9B is a side view illustrating a state in which a seated occupant has moved toward the front side from the state illustrated in FIG. 9A due to inertia in a head-on collision;

DETAILED DESCRIPTION

First Exemplary Embodiment

Explanation follows regarding a vehicle knee airbag device and a knee airbag folding method according to a first exemplary embodiment of the present invention, with reference to FIG. 1 to FIG. 8. Note that in each of the drawings, the arrow FR indicates a vehicle front side, the arrow UP indicates a vehicle upper side, and the arrow W indicates a vehicle width direction. In the following, unless specifically stated otherwise, reference simply to front and rear, left and right, and upward and downward directions refers to front and rear in a vehicle front-rear direction, left and right in a vehicle left-right direction (vehicle width direction), and upward and downward in a vehicle vertical direction.

Figure 1:
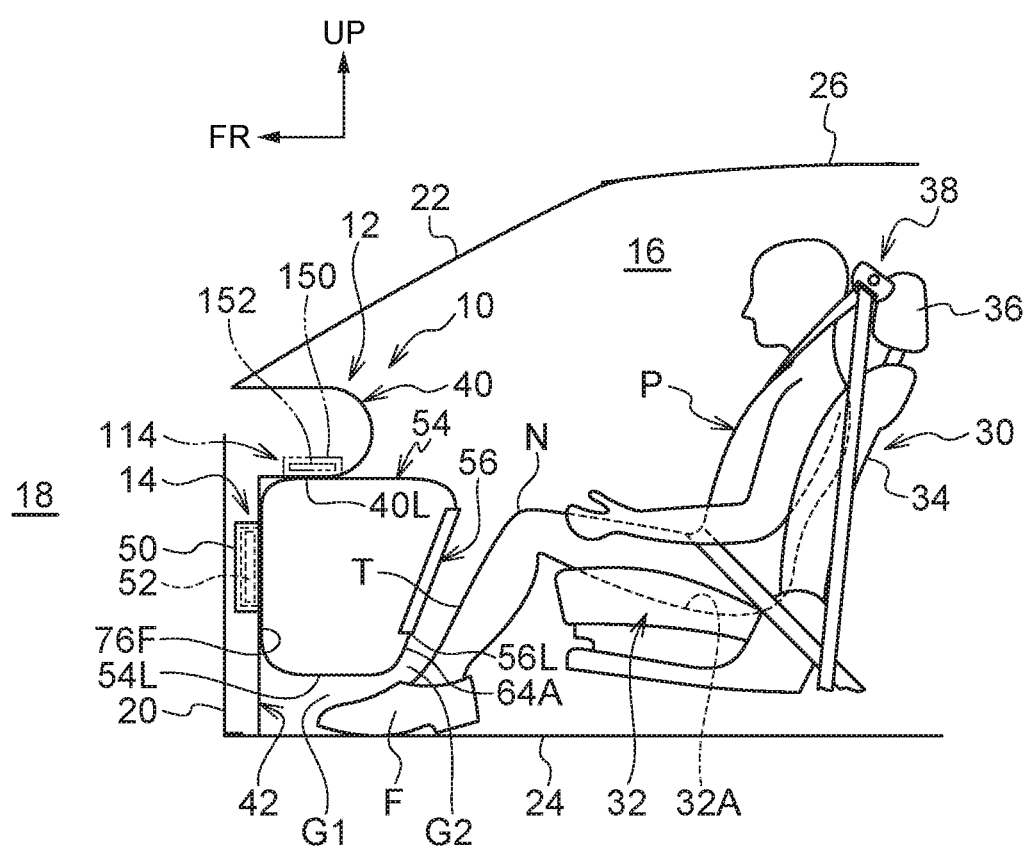
FIG. 1 is a side view illustrating an inflated and deployed state of a knee airbag of a vehicle knee airbag device according to a first exemplary embodiment of the present disclosure.
Figure 2:
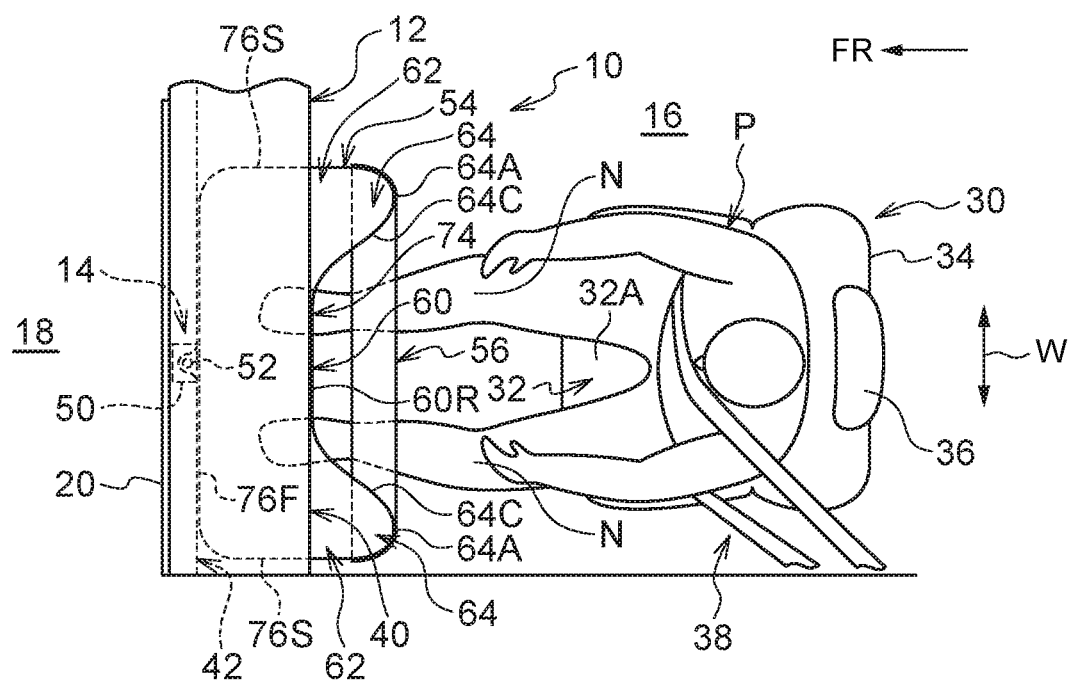
FIG. 2 is a plan view illustrating FIG. 1 in a state viewed from a vehicle vertical direction upper side.

As illustrated in FIG. 1 to FIG. 3, a vehicle knee airbag device 10 of the present exemplary embodiment includes an instrument panel 12 that is disposed in a front section of a vehicle cabin 16, and a knee airbag module 14 (see FIG. 1) that is installed at the instrument panel 12.

As illustrated in FIG. 1, the instrument panel 12 is disposed opposing a dash panel 20 with a predetermined space at a vehicle rear side of the dash panel 20. The dash panel 20 separates the vehicle cabin 16 from a vehicle front section 18. An upper end of the instrument panel 12 is disposed adjacent to a lower end side of a windshield glass 22, and a lower end of the instrument panel 12 is disposed adjacent to a front end side of a vehicle floor 24. An upper end of the windshield glass 22 configuring a front surface on an upper side of the vehicle cabin 16 is connected to a vehicle roof 26. A front end of the vehicle floor 24 configuring a lower surface of the vehicle cabin 16 is connected to the dash panel 20. A non-illustrated cowl that supports the lower end of the windshield glass 22 is joined to an upper end of the dash panel 20.

A front seat 30 is provided at a vehicle rear side of the instrument panel 12. In the present exemplary embodiment, the front seat 30 is configured as a front passenger seat at the front left-side of the vehicle cabin 16, and the other front seat 30 is configured as a driving seat at the front right-side of the vehicle cabin 16. A seat front-rear direction of the front seat 30 is aligned with the vehicle front-rear direction, and a seat width direction of the front seat 30 is aligned with the vehicle width direction. The front seat 30 includes a seat cushion 32, a seatback 34 of which a lower end is coupled to a rear end of the seat cushion 32, and a headrest 36 that is provided at an upper end of the seatback 34. A seating section 32A on which an occupant sits is configured by an upper face portion of the seat cushion 32, and the seat cushion 32 is able to be slid in the vehicle front-rear direction using a slide mechanism (not illustrated in the drawings). A three-point seatbelt device 38 is also installed to the front seat 30.

Note that FIG. 1, FIG. 2, and FIG. 7 illustrate a crash test dummy (mannequin) P, serving as a model of an occupant to be protected, in a seated state on the seat cushion 32 of the front seat 30. The dummy P is, for example, a 50$^{th}$ percentile American adult male (AM50) of World Side Impact Dummy (WorldSID). The dummy P is seated in a standard seated posture as specified in crash testing methods. To simplify explanation, the dummy P will be referred to as the "seated occupant P" hereafter. Note that FIG. 1, FIG. 2, and FIG. 7 illustrate examples in which the seated occupant P is seated at a seat slide position which has been set toward a rear side.

Figure 4:
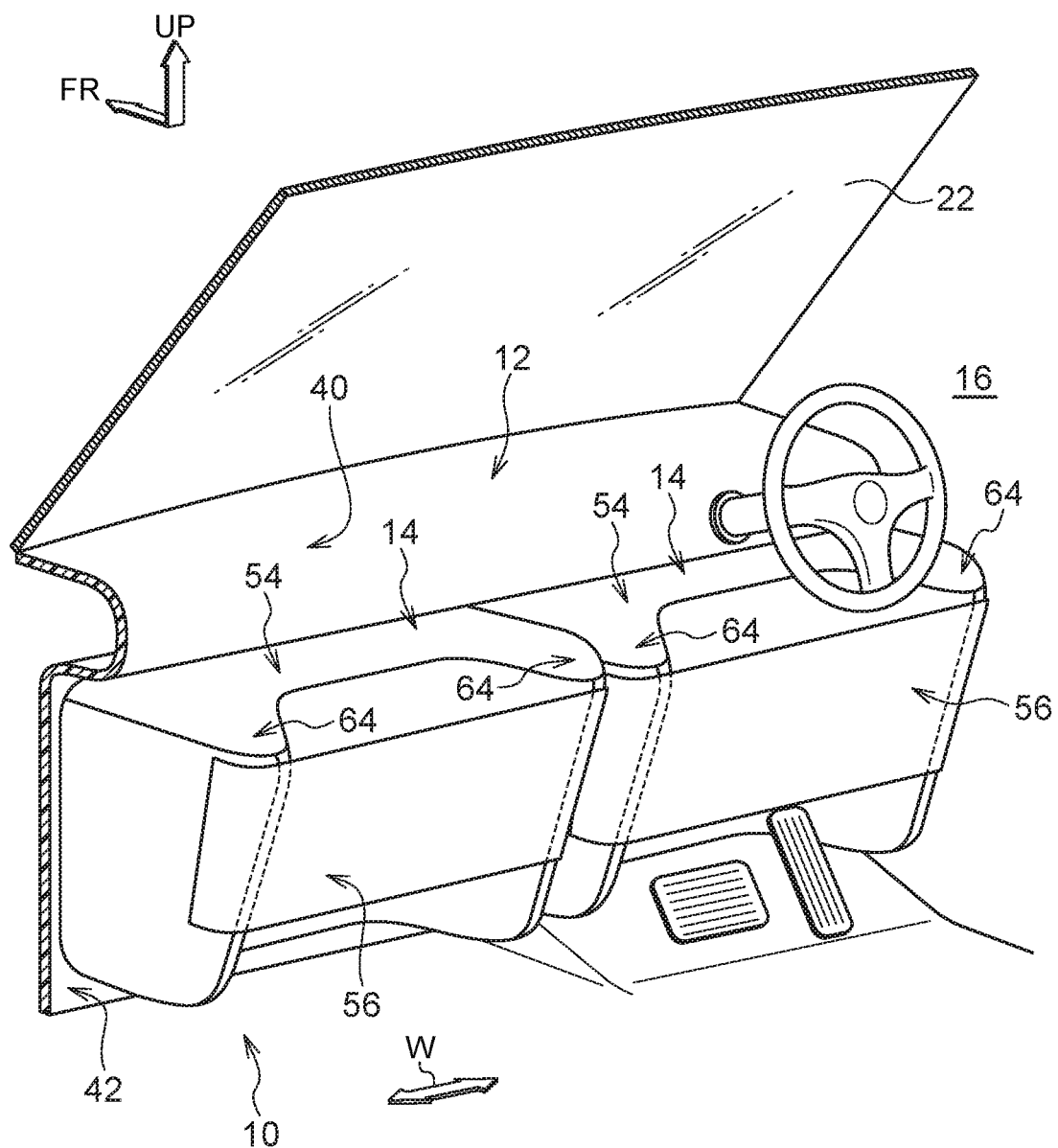
FIG. 4 is a perspective view illustrating a state in which respective knee airbags at the front side of a driving seat and a front passenger seat have been inflated and deployed.

As illustrated in FIG. 4, the instrument panel 12 configures an interior panel member that extends along the vehicle width direction. An elongated instrument panel reinforcement (not illustrated in the drawings) is arranged running along the vehicle width direction at an upper inner side portion of the instrument panel 12. The instrument panel 12 is attached to the instrument panel reinforcement at plural locations. Note that the instrument panel reinforcement is configured by a metal pipe member, of which both length direction ends are fixed to a non-illustrated pair of front pillars (left and right framework members) provided standing upright at respective left and right vehicle body side sections.

Figure 3B:
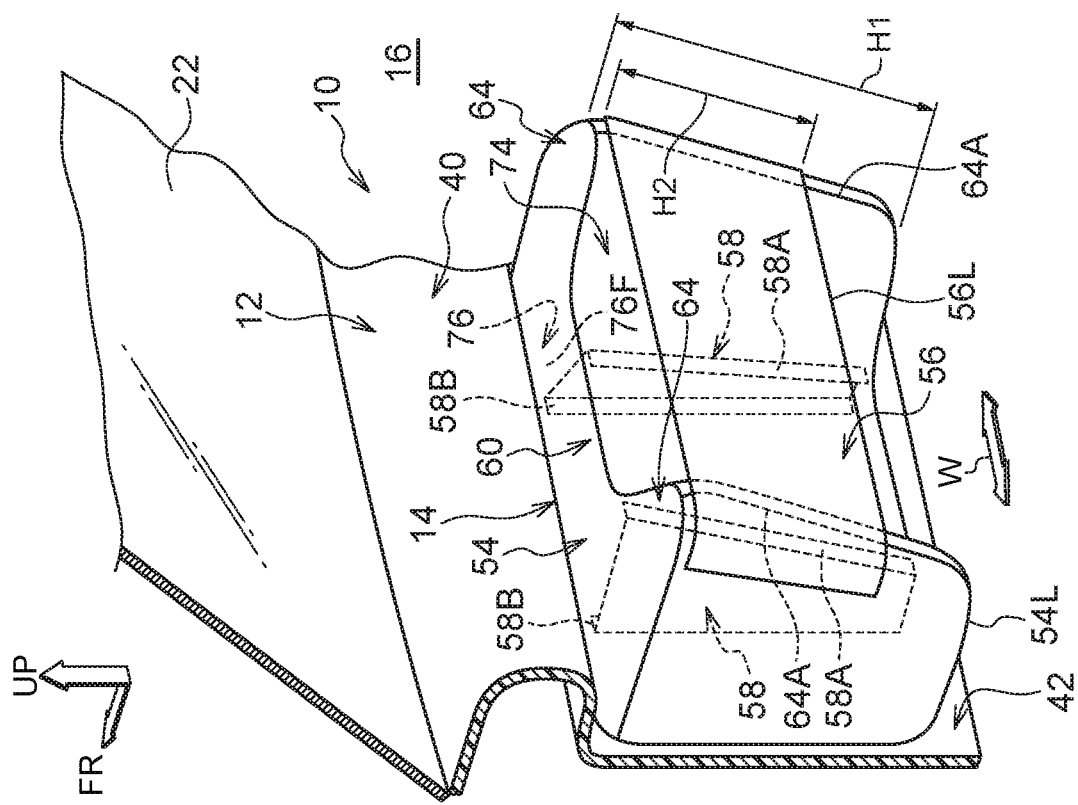
FIG. 3B is a perspective view illustrating a state in which a knee airbag of a vehicle knee airbag device according to the first exemplary embodiment has been inflated and deployed.
Figure 3A:
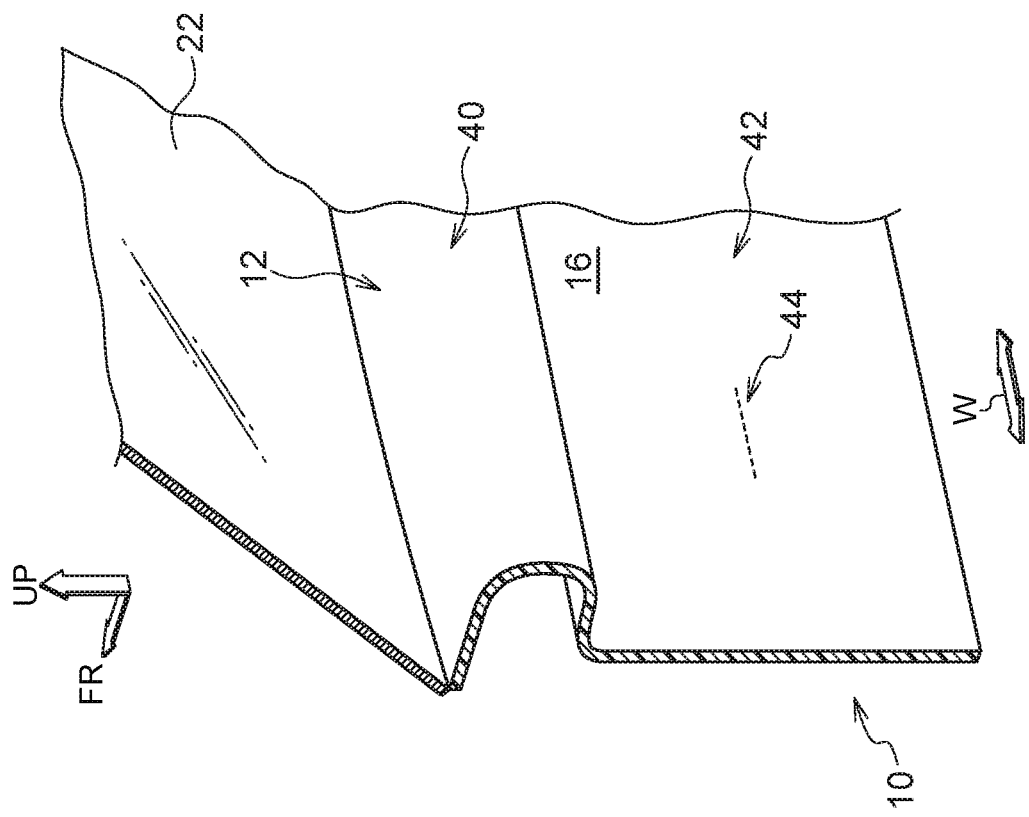
FIG. 3A is a perspective view illustrating a state prior to inflation and deployment of a knee airbag of a vehicle knee airbag device according to the first exemplary embodiment.

As illustrated in FIG. 1 and FIG. 3A, the instrument panel 12 is, for example, configured including a protruding profile section 40 that protrudes toward the inner side of the vehicle cabin, and an upright wall section 42 that is adjacent to a vehicle lower side of a lower wall at a vehicle front side of the protruding profile section 40. The protruding profile section 40, which configures an upper section of the instrument panel 12, is formed in substantially a U-shape that is open at a vehicle front side in a side view cross-section as seen from the vehicle width direction outer side. As illustrated in FIG. 1, a position in a vehicle vertical direction of the protruding profile section 40 is configured to be further toward the vehicle upper side than knees N of the seated occupant P in the front seat 30. Further, as illustrated in FIG. 3A, the upright wall section 42 and the protruding profile section 40 are formed integrally to one another in the present exemplary embodiment, and the upright wall section 42 extends in the vehicle vertical direction and the vehicle width direction. Slits 44 are formed at a vehicle vertical direction intermediate portion of the upright wall section 42 so as to face the front seat 30 (see FIG. 1). The slits 44 are, for example, formed intermittently along the vehicle width direction. However, a slit 44 may be formed continuously along the vehicle width direction.

As illustrated in FIG. 1, the knee airbag module 14 is installed at a vehicle front side of the upright wall section 42 of the instrument panel 12. The knee airbag module 14 is configured including an airbag case 50, an inflator 52, and a knee airbag 54.

The airbag case 50 is made of a metallic material or the like, and is disposed at a back face (front face) side of the upright wall section 42 of the instrument panel 12 so as to open toward the vehicle rear side. The airbag case 50 is supported by a strong member such as the non-illustrated instrument panel reinforcement via a bracket. A rear end opening of the airbag case 50 is disposed at a position corresponding to the slits 44 (see FIG. 3A). The upright wall section 42 is configured so as to rupture at the slits 44 (see FIG. 3A) and expose the rear end opening of the airbag case 50 when subjected to a bag inflation pressure greater than or equal to a predetermined value.

The inflator 52 is configured so as to eject gas during a head-on collision of the vehicle, or when a head-on collision has been predicted, and supply the gas into the knee airbag 54. The inflator 52 is, for example, a cylindrical gas generator. The inflator 52 is connected to an airbag ECU via a wire harness (neither of these are illustrated in the drawings). The inflator 52 is actuated by an actuation current from the airbag ECU, thereby generating gas. The airbag ECU applies the actuation current to the inflator 52 when a vehicle head-on collision has been determined, or a vehicle head-on collision has been predicted according to a signal from a collision sensor (not illustrated in the drawings).

The knee airbag 54 is, for example, formed in a bag shape by stitching together plural panels that have been cut out from a nylon-based or a polyester-based base cloth, and is normally stored in the airbag case 50 in folded-up state. The inflator 52 is housed inside the knee airbag 54. Non-illustrated stud bolts are provided standing out at peripheral wall portions of the inflator 52. The stud bolts pass through the knee airbag 54 and pass through the airbag case 50. Ends of the stud bolts passed to the outside of the airbag case 50 are screwed with non-illustrated nuts, thereby fixing both the knee airbag 54 and the inflator 52 to the airbag case 50. Note that a diffuser, formed with a slightly larger circular tube shape than the inflator 52, may be arranged at a periphery the inflator 52. To give a specific example, the stud bolts mentioned above may be provided projecting from the diffuser instead of being provided projecting from the inflator 52. After inserting the inflator 52 into the diffuser, the diffuser may be crimped radially inward such that the inflator 52 and the diffuser are configured as a single unit.

On receipt of a supply of gas generated by the inflator 52, the knee airbag 54 inflates and deploys at least toward a front side of the knees N of the seated occupant P in the front seat 30 and toward a lower side of the protruding profile section 40. Detailed explanation follows regarding the inflation and deployment range of the knee airbag 54. As illustrated in FIG. 2, the knee airbag 54 is configured including a front face panel 74, this being an occupant-side base cloth portion that is disposed at an occupant-facing side (a vehicle rear side) of the knee airbag 54 when in an inflated and deployed state, and a non-occupant-side base cloth portion 76F that is disposed at a non-occupant-facing side (a vehicle front side) of the knee airbag 54 when in the inflated and deployed state. The knee airbag 54 is configured such that in the inflated and deployed state, a vehicle rear side location of the knee airbag 54 (a location including both sides of the front face panel 74) is disposed at a vehicle rear side from a rear end of the protruding profile section 40. As illustrated in FIG. 1 and FIG. 2, the non-occupant-side base cloth portion 76F is configured so as to be disposed adjacent to the upright wall section 42 in an inflated and deployed state of the knee airbag 54. Further, as illustrated in FIG. 1, the knee airbag 54 is configured such that in the inflated and deployed state, a vehicle upper side end of the knee airbag 54 is disposed adjacent to a lower wall 40L of the protruding profile section 40. A lower end of the knee airbag 54 is disposed, in the inflated and deployed state, to forms a gap G1 between a vehicle vertical direction lower end 54L of the knee airbag 54 and the vehicle floor 24, into which the feet F (portions from ankles downward) of the seated occupant P are able to get in. As illustrated in FIG. 2, a left-right direction dimension of the knee airbag 54 when in the inflated and deployed state is configured to be larger than a width dimension of the seated occupant P.

The knee airbag 54 is inflates and deployed into a shape in which a left-right direction intermediate portion 60 of the knee airbag 54 is recessed, as viewed from a side of the seated occupant P. In the inflated and deployed state, the left-right direction intermediate portion 60 and left and right side portions 62 bulge in different shapes to each other. The left-right direction intermediate portion 60 is disposed such that a location 60R of the left-right direction intermediate portion 60 on the seated occupant P side runs along the vehicle width direction (in other words, parallel to the upright wall section 42) in plan view. Further, side face portions 76S on respective left and right outer sides of the side portions 62 are disposed so as to run along the vehicle front-rear direction in plan view.

Each of the side portions 62 includes a bulging portion 64. The bulging portions 64 configure left and right end sides of the knee airbag 54 in an inflated and deployed state, and bulge out further toward a vehicle rear than the left-right direction intermediate portion 60. The pair of bulging portions 64 are inclined such that in plan view, mutually opposing faces 64C in the vehicle width direction approach one other on progression from respective bulge leading edge sides toward a base-end side. As illustrated in FIG. 1, the pair of bulging portions 64 are also configured such that lengths in a bulge-direction thereof gradually increase on progression from a lower end side toward an upper end side in side view, and bulge leading edges 64A are inclined toward the vehicle rear side on progression toward the vehicle upper side.

Figure 5:
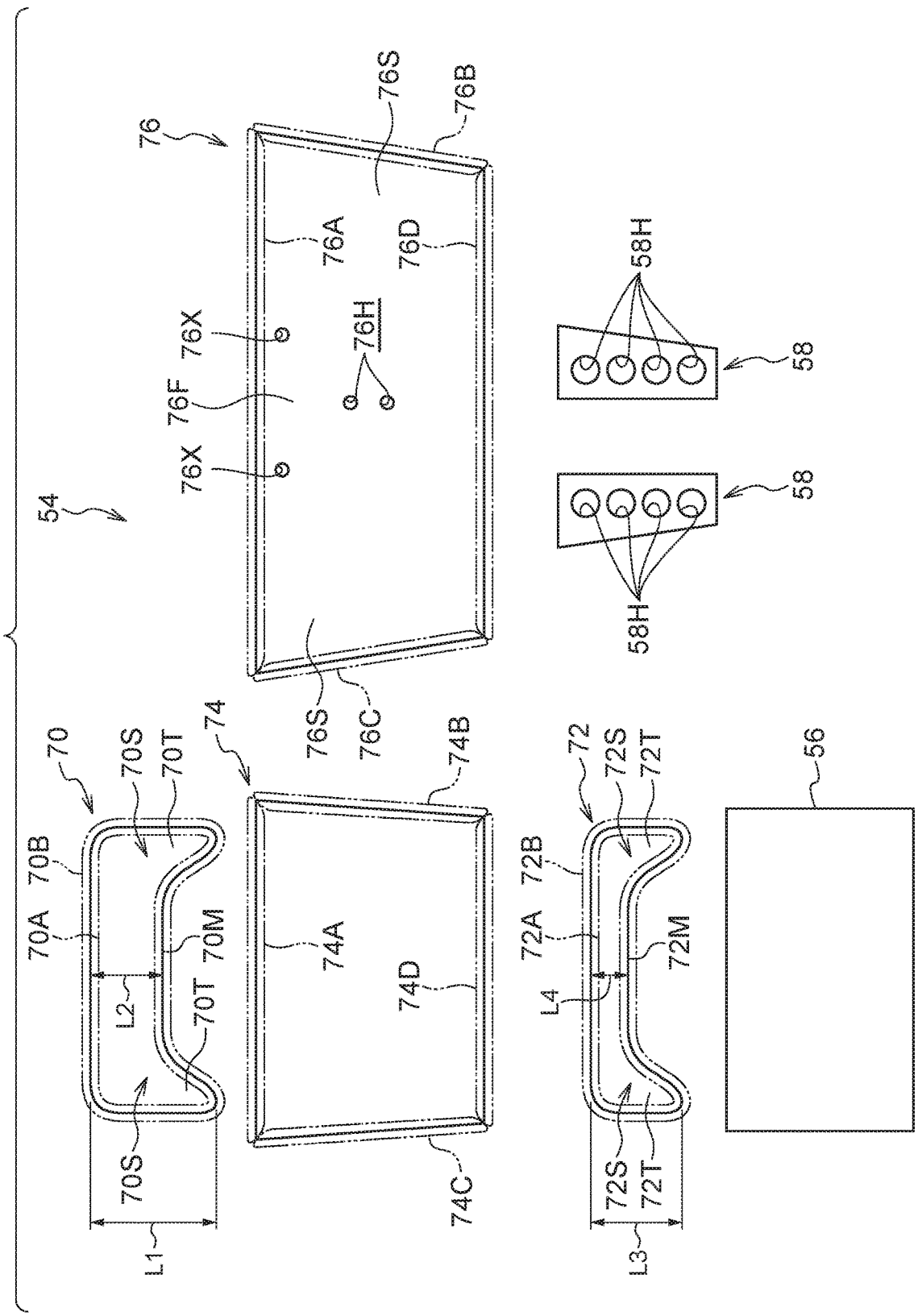
FIG. 5 is an exploded view illustrating a state in which a knee airbag, cloth members, and a coupling cloth in FIG. 3B are illustrated in a dismantled state.

As illustrated in FIG. 5, the knee airbag 54 is configured including an upper face panel (also called a "base cloth top sheet") 70, a lower face panel (also called a "base cloth bottom sheet") 72, the front face panel 74, and a back face panel 76.

The upper face panel 70 configures an upper face of the knee airbag 54 when in the inflated and deployed state. The upper face panel 70 has a shape including bulging portions 70T where a left and right pair of side portions 70S each bulge out toward the same side (the lower side in the drawings) in plan view. The bulging portions 70T are substantially wedge shaped. A vehicle front-rear direction (the vertical direction in the drawings) length L2 of a left-right direction intermediate portion (main portion) 70M of the upper face panel 70 is, for example, configured so as to be uniform. A front-rear direction length L1 of the left and right pair of side portions 70S and a vehicle front-rear direction length L2 of the left-right direction intermediate portion 70M is L1>L2. The upper face panel 70 is disposed such that the bulging portions 70T of the left and right pair of side portions 70S bulge toward the vehicle rear side in an inflated and deployed state of the knee airbag 54.

The lower face panel 72 configures a lower face of the knee airbag 54 when in the inflated and deployed state. The lower face panel 72 has a shape including bulging portions 72T where a left and right pair of side portions 72S each bulge out toward the same side (the lower side in the drawings) in plan view. The bulging portions 72T are substantially wedge shaped. A vehicle front-rear direction (the vertical direction in the drawings) length L4 of a left-right direction intermediate portion (main portion) 72M of the lower face panel 72 is, for example, configured so as to be uniform. A front-rear direction length L3 of the left and right pair of side portions 72S and a vehicle front-rear direction length L4 of the left-right direction intermediate portion 72M is L3>L4. The lower face panel 72 is disposed such that the bulging portions 72T of the left and right pair of side portions 72S bulge toward the vehicle rear side in an inflated and deployed state of the knee airbag 54.

The length L2 of the left-right direction intermediate portion 70M of the upper face panel 70 and the length L4 of the left-right direction intermediate portion 72M of the lower face panel 72 is L2>L4. Further, the length L1 of the side portions 70S of the upper face panel 70 and the length L3 of the side portions 72S of the lower face panel 72 is L1>L3.

The front face panel 74 is disposed on the occupant-facing side of the knee airbag 54 when in the inflated and deployed state (in other words, on the side toward the front seat 30 (see FIG. 1)), and is formed in a trapezoidal shape with left-right symmetry. The back face panel 76 is configured with the non-occupant-side base cloth portion (back face portion) 76F and the side face portions 76S. The non-occupant-side base cloth portion 76F is disposed on the non-occupant-facing side of the knee airbag 54 in the inflated and deployed state (in other words, on the upright wall section 42 side of the instrument panel 12). The side face portions 76S face the respective sides in an inflated and deployed state of the knee airbag 54. The back face panel 76 is formed in a trapezoidal shape with left-right symmetry, and has a larger left-right direction dimension than the front face panel 74.

Attachment holes 76H for attaching the inflator 52 (see FIG. 1) are formed penetrating a left-right direction central portion of the back face panel 76. The stud bolts (not illustrated in the drawings) provided standing out from the inflator 52 pass through the attachment holes 76H. Note that in a modified example of the present exemplary embodiment, gas supply holes coupled to an inflator (52) (holes through which gas is supplied from the inflator (52)) may be formed penetrating a left-right direction central portion of a back face panel (76). Vent holes 76X are also formed penetrating the back face panel 76.

An outer peripheral edge of the upper face panel 70 (see the portion surrounded by the double-dotted dashed lines 70A, 70B) of the knee airbag 54 is stitched to respective upper edges of the front face panel 74 and the back face panel 76 (see the portion surrounded by the double-dotted dashed line 74A and the portion surrounded by the double-dotted dashed line 76A) of the knee airbag 54. Right edges of the front face panel 74 and the back face panel 76 (see the portion surrounded by the double-dotted dashed line 74B and the portion surrounded by the double-dotted dashed line 76B) of the knee airbag 54 are stitched together, and left edges of the front face panel 74 and the back face panel 76 (see the portion surrounded by the double-dotted dashed line 74C and the portion surrounded by the double-dotted dashed line 76C) are also stitched together. Further, an outer peripheral edge of the lower face panel 72 (see the portion surrounded by the double-dotted dashed lines 72A, 72B) is stitched to respective lower edges of the front face panel 74 and the back face panel 76 (see the portion surrounded by the double-dotted dashed line 74D and the portion surrounded by the double-dotted dashed line 76D) of the knee airbag 54.

As illustrated in FIG. 2 and in FIG. 3B, a coupling cloth 56 is provided to the knee airbag module 14. The coupling cloth 56 couples together locations forming the bulge leading edge 64A side of the pair of bulging portions 64 in an inflated and deployed state of the knee airbag 54. As illustrated in FIG. 1, when the knee airbag 54 is inflated and deployed, the coupling cloth 56 adopts a state stretched across a range encompassing the front side of the knees N and most of the front side of the shins T of the seated occupant P at the front seat 30. The coupling cloth 56 contributes to retaining the shape of the knee airbag 54 illustrated in FIG. 3B when inflated and deployed. The coupling cloth 56 is, for example, formed by a fabric that stretches more readily than the base cloth configuring the knee airbag 54; however, the coupling cloth 56 may be formed by a fabric that stretches as easily as the base cloth configuring the knee airbag 54, or by a fabric that stretches less readily than the base cloth configuring the knee airbag 54.

As illustrated in FIG. 3B, in an inflated and deployed state of the knee airbag 54, a vertical direction dimension H2 of the coupling cloth 56 is smaller than a vertical direction dimension H1 of the bulge leading edges 64A. Further, in an inflated and deployed state of the knee airbag 54, an upper end of the coupling cloth 56 is set so as to cover the upper end side of the knee airbag 54, and the position of the vertical direction center of the coupling cloth 56 is arranged at a position offset to an vehicle upper side from the position of the vertical direction center of the knee airbag 54.

In other words, a vehicle vertical direction lower end 56L of the coupling cloth 56 is disposed further toward a vehicle upper side than the vehicle vertical direction lower end 54L of the knee airbag 54 in an inflated and deployed state. Further, as illustrated in FIG. 1, a position of a vehicle vertical direction lower end of the coupling cloth 56 forms a gap G2, into which the feet F of the seated occupant P in the front seat 30 can get in, between the vehicle vertical direction lower end 56L of the coupling cloth 56 and the vehicle floor 24.

As illustrated in FIG. 3B, left and right cloth members 58 (also called "tethers", and that may be understood as elements serving as "deformation-restricting members") are arranged inside the knee airbag 54. The cloth members 58 couple left-right direction intermediate portions of the front face panel 74 to the non-occupant-side base cloth portion 76F of the back face panel 76. A vehicle rear-side end 58A of each cloth member 58 is stitched to the front face panel 74 so as to be fixed thereto, and a vehicle front-side end 58B of each cloth member 58 is stitched to the non-occupant-side base cloth portion 76F of the back face panel 76 so as to be fixed thereto. In an inflated and deployed state of the knee airbag 54, a distance between points where the cloth members 58 are coupled to the non-occupant-side base cloth portion 76F is longer than a distance between points where the cloth members 58 are coupled to the front face panel 74. The cloth members 58 extend so as to be inclined away from each other on progression toward the vehicle front side in an inflated and deployed state of the knee airbag 54, and are configured to limit bulging of a left-right direction intermediate portion of the front face panel 74 toward the vehicle rear. The coupling cloth 56 and the cloth members 58 are fixed such that vehicle vertical direction positions of the coupling cloth 56 and the cloth members 58 overlap one another in an inflated and deployed state of the knee airbag 54.

As illustrated in FIG. 5, the cloth members 58 are formed with through holes 58H (not illustrated in FIG. 3B) for the passage of gas. Note that the cloth members 58 are, for example, made using the same material as that of the knee airbag 54.

As illustrated in FIG. 4, in the present exemplary embodiment, knee airbag modules 14 are disposed at the front side of each of a non-illustrated driving seat and the front passenger seat. A left and right pair of the knee airbags 54 are configured so as to press against one another at a vehicle width direction center of a front section of the vehicle cabin 16 in the inflated and deployed state.

Explanation follows regarding a method of folding the knee airbag 54 included in the knee airbag module 14 of the vehicle knee airbag device 10, with reference to FIG. 6.

To begin, in a first process, left and right end sides of the knee airbag 54 in a state prior to folding (a state opened out in plan view) illustrated in FIG. 6A are folded toward a left-right direction center plural times at fold lines L1, L2 running along a knee airbag vertical direction such that a side of the knee airbag 54 that faces the seated occupant P (see FIG. 1) in an inflated and deployed state is folded so as to be positioned at an inner side (see arrows a, b), thereby achieving the state illustrated in FIG. 6B. A left and right pair of folded portions 54A, 54B appear side-by-side in FIG. 6B. Note that in FIG. 6A, the dotted and dashed line CL is a center line indicating a left-right direction center of the knee airbag 54.

In a second process, following the first process, upper and lower end sides of the knee airbag 54 illustrated in FIG. 6B are folded plural times toward a vertical direction center at fold lines L3, L4 running along a knee airbag left-right direction, such that a side at which the left and right pair of folded portions 54A, 54B appear side-by-side is folded so as to be positioned at an inner side (see arrows c, d), thereby achieving the state illustrated in FIG. 6C. A folded knee airbag 54 is thereby obtained.

Note that in FIG. 6A to FIG. 6C, in order to facilitate explanation of the folding method of the knee airbag 54, in the first process, the number of folds is illustrated as being two folds on each of the left and right, and in the second process, the number of folds is illustrated as being two folds on each of the top and bottom. However, the number of folds in the knee airbag 54 may be set as appropriate in accordance to the size, etc., of the airbag case 50 (see FIG. 1). Further, in the interests of simplicity, the knee airbag 54 and the coupling cloth 56 are illustrated in a simplified manner in FIG. 6A.

Operation and Advantageous Effects

Explanation follows regarding the operation and advantageous effects of the above exemplary embodiment.

Due to the above configuration, the knee airbag 54 of the knee airbag module 14 illustrated in FIG. 1 inflates and deploys toward at least the front side of the knees N of the seated occupant P in the front seat 30 and the lower side of the protruding profile section 40 of the instrument panel 12 on receipt of a supply of gas. After inflation and deployment of the knee airbag 54, the non-occupant-side base cloth portion 76F of the knee airbag 54 is disposed adjacent to the upright wall section 42. Note that a vehicle front-rear direction space between the upright wall section 42 and the knees N of the seated occupant P is wider than a space between the protruding profile section 40 and the knees N of the seated occupant P. Thus, even if a thickness in the vehicle front-rear direction of the knee airbag 54 is thick, it is possible to prevent or suppress contact between the knee airbag 54 and the knees N of the seated occupant P in the front seat 30 during the inflation and deployment process. Further, since the knee airbag 54, for which a vehicle front-rear direction thickness is thick after inflation and deployment, bears a reaction force from the upright wall section 42 when restraining the knees N of the seated occupant P in a head-on collision, the knees N of the seated occupant P are effectively protected by the knee airbag 54.

Figure 7A:
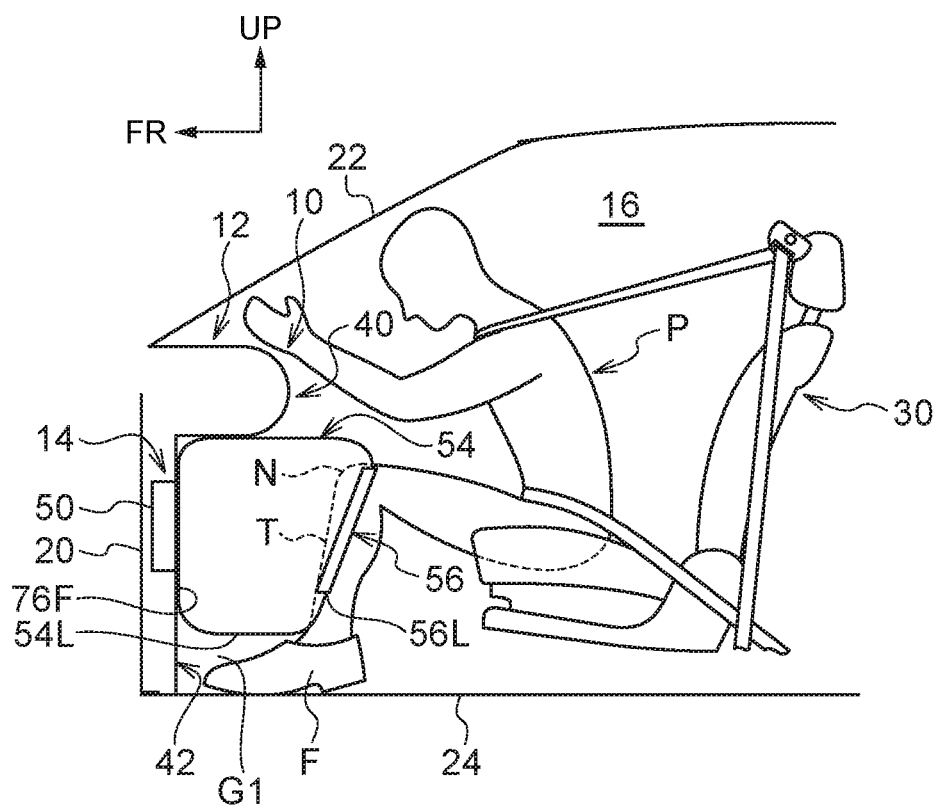
FIG. 7A is a side view illustrating a state in the first exemplary embodiment in which a seat sliding position has been set toward a rear side and a seated occupant has moved toward a front side due to inertia in a head-on collision.
Figure 7B:
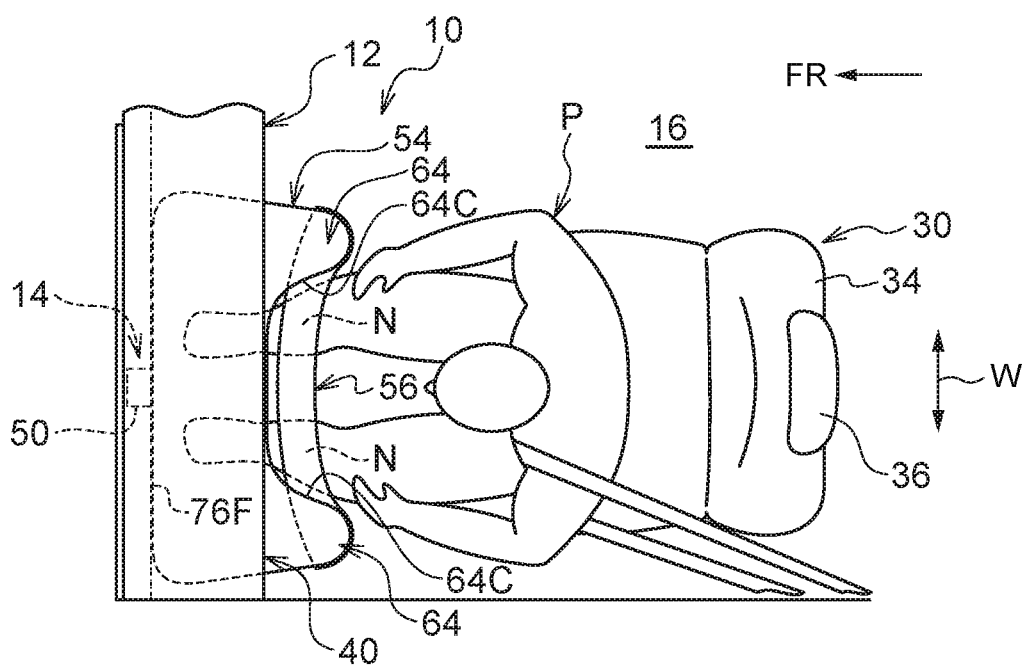
FIG. 7B is a plan view illustrating FIG. 7A in a state viewed from the vehicle vertical direction upper side.

As illustrated in FIG. 3B, the bulging portions 64 configuring left and right end sides of the knee airbag 54 when inflated and deployed bulge further toward the vehicle rear than the left-right direction intermediate portion 60. Locations configuring the bulge leading edge 64A sides of the pair of bulging portions 64 are coupled together by the coupling cloth 56. The coupling cloth 56 adopts a state stretched across the range encompassing the front side of the knees N of the seated occupant P when the knee airbag 54 is inflated and deployed. As illustrated in FIG. 7A, in cases in which the knee airbag 54 has been inflated and deployed in a head-on collision, the knees N of the seated occupant P move under inertia toward the vehicle front side and are caught by the coupling cloth 56, and the knees N push the coupling cloth 56 toward the vehicle front side. Here, as illustrated in FIG. 7B, the pair of bulging portions 64 are pushed toward the vehicle front side while being pulled in toward the left-right direction center due to the pressing on the coupling cloth 56. The coupling cloth 56 is gradually displaced toward the vehicle front side in accordance therewith, thereby suppressing load from the coupling cloth 56 from acting on the knees N.

As illustrated in FIG. 3B, the bulging portions 64 of the knee airbag 54 gradually increase in bulge-direction lengths on progression from a lower end side toward an upper end side, such that the bulge leading edges 64A are inclined toward the vehicle rear side on progression toward the vehicle upper side. The face of the coupling cloth 56 illustrated in FIG. 1 that faces the seated occupant P is thus inclined further toward the vehicle rear side on progression toward the vehicle upper side. This makes it easier for the knees N of the seated occupant P to make contact with the coupling cloth 56 before the shins T. Further, as illustrated in FIG. 2, the pair of bulging portions 64 are inclined such that the mutually opposing faces 64C approach one another in the vehicle width direction on progression from a bulge leading edge side toward a base-end side. Thus, as illustrated in FIG. 7B, the left and right knees N are guided by the opposing faces 64C of the pair of bulging portions 64 so as to bring the knees N closer together.

Thus, in present exemplary embodiment, the knees N of the seated occupant P are caught by the coupling cloth 56 in a head-on collision, enabling impact to the knees N of the seated occupant P to be softened, and enabling the left and right knees N to be guided toward each other in a closing direction.

Further, in the present exemplary embodiment, as illustrated in FIG. 3B, the left and right cloth members 58 couple the left-right direction intermediate portions of the front face panel 74 to the non-occupant-side base cloth portion 76F. The left and right cloth members 58 also extend so as to be inclined away from each other on progression toward the vehicle front side in an inflated and deployed state of the knee airbag 54 so as to limit bulging of the left-right direction intermediate portions of the front face panel 74 toward the vehicle rear side. Thus, when the knee airbag 54 inflates and deploys, the shape of the left-right direction intermediate portion 60 of the knee airbag 54 and the shape of the left and right pair of bulging portions 64 are stably maintained by tension from the left and right cloth members 58. Namely, in the present exemplary embodiment, the shape of the knee airbag 54 when inflated and deployed is able to be stably maintained by the left and right cloth members 58.

Moreover, in the present exemplary embodiment, the coupling cloth 56 is configured such that its position overlaps with a position of the cloth members 58 in the vehicle vertical direction in an inflated and deployed state of the knee airbag 54. Thereby, since tension from the coupling cloth 56 and the left and right cloth members 58 acts where the positions thereof overlap in the vehicle vertical direction, the shape of the knee airbag 54 when inflated and deployed can be even more stably maintained when the knee airbag 54 is inflated and deployed.

As explained above, in a structure in which the position in the vehicle vertical direction of the protruding profile section 40 of the instrument panel 12 is set further toward the vehicle upper side than the knees N of the seated occupant P in the front seat 30 illustrated in FIG. 1, the vehicle knee airbag device 10 according to the present exemplary embodiment can effectively protect the knees N of the seated occupant P in a head-on collision.

Further, in the present exemplary embodiment, in cases in which the knee airbag 54 has inflated and deployed as illustrated in FIG. 3B, since the lower end 56L of the coupling cloth 56 is disposed further toward the vehicle upper side than the lower end 54L of the knee airbag 54, the gap G2 illustrated in FIG. 1 is formed between the vehicle floor 24 and the lower end 56L of the coupling cloth 56 regardless of the position of the lower end of the knee airbag 54. This results in an advantageous structure in which contact between the feet F of the seated occupant P and the coupling cloth 56 can be avoided in a head-on collision as illustrated in FIG. 1 and FIG. 7A.

Namely, such a structure enables the feet F of the seated occupant P to be effectively suppressed from being pushed back by the coupling cloth 56 in a head-on collision.

Further, in the present exemplary embodiment, as illustrated in FIG. 1, the position of the vehicle vertical direction lower end of the knee airbag 54 is configured to form the gap G1, into which the feet F of the seated occupant P are able to get in, between the vehicle vertical direction lower end 54L of the knee airbag 54 and the vehicle floor 24 in an inflated and deployed state of the knee airbag 54. When the knee airbag 54 has been inflated and deployed, since the feet F of the seated occupant P are able to get in between the vehicle vertical direction lower end 54L and the vehicle floor 24, as illustrated in FIG. 7A, contact between the feet F of the seated occupant P and the knee airbag 54 is suppressed in a head-on collision. Namely, in a head-on collision, such a structure enables the feet F of the seated occupant P to be effectively suppressed from being pushed back by the knee airbag 54, and enables the feet F to be even more effectively suppressed from being pushed back by the coupling cloth 56.

Further, in the present exemplary embodiment, the knee airbag 54 is folded as described above by performing the first process and the second process illustrated in FIG. 6A to FIG. 6C. Thus folded, the knee airbag 54 deploys upward and downward in the first half of inflation and deployment in a head-on collision, and then inflates and deploys so as to open out toward the left and right, such that the coupling cloth 56 illustrated in FIG. 2 is stretched in the left-right direction. Thus, even if the knees N of the seated occupant P were to abut the coupling cloth 56 before inflation and deployment of the knee airbag 54 is complete, since the coupling cloth 56 is not yet taut, any load acting on the knees N of the seated occupant P can be suppressed to a low amount before inflation and deployment of the knee airbag 54 is complete.

Further, as illustrated in FIG. 4, in the present exemplary embodiment, the left and right pair of knee airbags 54 press against one another at the vehicle width direction center of the front section of the vehicle cabin 16 when inflated and deployed. Thus, the knee airbags 54 are not liable to move to the left or right when the coupling cloth 56 bears load from the seated occupant P (see FIG. 7). The coupling cloths 56 are thus able to stably bear load from the seated occupant P (see FIG. 7).

Figure 8A:
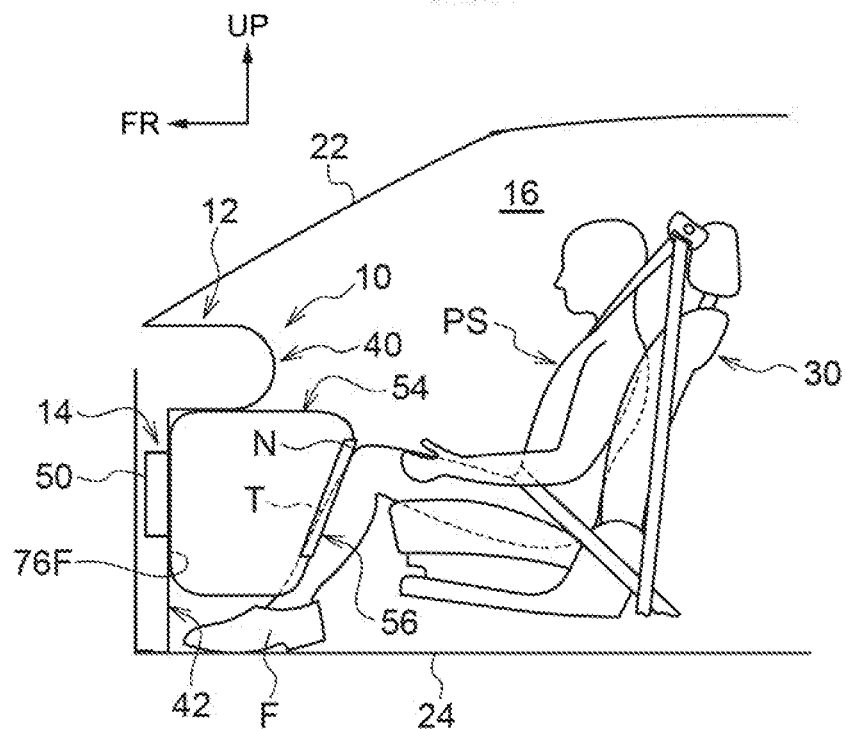
FIG. 8A is a side view illustrating a state in the first exemplary embodiment in which a small-bodied occupant is seated with a seat slide position set slid toward the front side, and in which a knee airbag has been inflated and deployed.
Figure 8B:
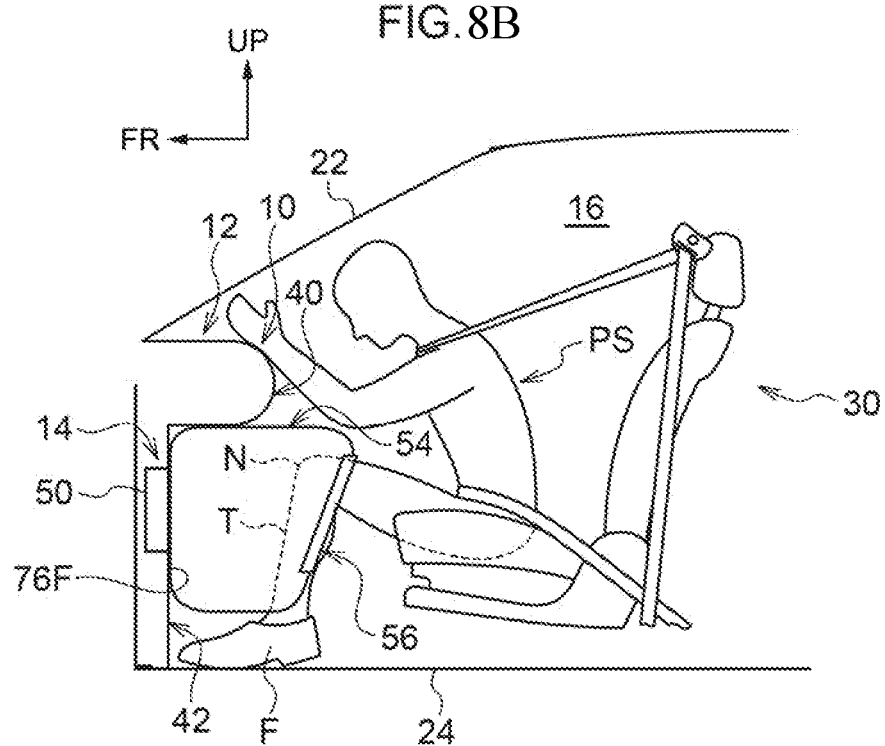
FIG. 8B is a side view illustrating a state in which the small-bodied occupant has moved toward the front side from the state illustrated in FIG. 8A due to inertia in a head-on collision.

Further, as illustrated in FIG. 8A, in cases in which, for example, a small-bodied occupant PS has set the seat slide position of the front seat 30 toward a front side and is sitting on the front seat 30, when the knee airbag 54 inflates and deploys, the knees N and shins T of the occupant PS will make contact with the coupling cloth 56 during deployment. Since the coupling cloth 56 deploys in a direction stretched along the left-right direction, load acting on the knees N and the shins T of the occupant PS can be reduced compared to cases in which, for example, a knee airbag inflating in the vehicle front-rear direction were to make contact with the knees N and the shins T of the occupant PS. Note that as illustrated in FIG. 8B, a state in which a small-bodied occupant PS moves toward the vehicle front side due to inertia in a head-on collision is substantially the same as that in cases in which the typical seated occupant P illustrated in FIG. 7 moves toward the vehicle front side due to inertia.

Modified Example of the First Exemplary Embodiment

In the above first exemplary embodiment, the knee airbag module 14 illustrated in FIG. 1 is installed at the vehicle front side of the upright wall section 42 of the instrument panel 12. However, in a modified example, a knee airbag module 114 is installed at a vehicle upper side of the lower wall 40L of the protruding profile section 40, as illustrated by double-dotted dashed lines in FIG. 1. Supplemental explanation follows regarding this modified example.

The knee airbag module 114 is configured including an airbag case 150 illustrated by double-dotted dashed lines, an inflator 152 illustrated by double-dotted dashed lines, and a knee airbag that is substantially the same as the knee airbag 54. The knee airbag has a similar structure to that of the knee airbag 54 except for that attachment holes for attaching the inflator 152 are formed penetrating a left-right direction central portion of the upper face panel (70 (see FIG. 5)) instead of the left-right direction central portion of the back face panel (76 (see FIG. 5)). In the following explanation, the knee airbag of the present embodiment is referred to as the knee airbag 54 as a matter of convenience. Normally, the knee airbag 54 is stored in the airbag case 150 in folded-up state, and the inflator 152 is housed inside the knee airbag 54.

The airbag case 150 is made of a metallic material of the like, similarly to the airbag case 50, and is disposed at a back face (upper face) side of the lower wall 40L of the protruding profile section 40 of the instrument panel 12, so as to open toward the vehicle lower side. The airbag case 150 is supported by a strong member such as the non-illustrated instrument panel reinforcement via a bracket. Non-illustrated slits are formed in the lower wall 40L of the protruding profile section 40 in correspondence with the lower end opening of the airbag case 150. The slits are substantially the same as the slits 44 (see FIG. 3A). The lower wall 40L of the protruding profile section 40 is configured so as to rupture at the slits and expose the lower end opening of the airbag case 150 when subjected to a bag inflation pressure greater than or equal to a predetermined value.

The inflator 152 is a gas generator that is similar to the inflator 52. Non-illustrated stud bolts are provided standing out at peripheral wall portions of the inflator 152. The stud bolts pass through the knee airbag 54 and pass through the airbag case 150. Ends of the stud bolts passed to the outside of the airbag case 150 are screwed with non-illustrated nuts, thereby fixing the knee airbag 54 to the airbag case 150 together with the inflator 152.

On receipt of a supply of gas from the inflator 152, the knee airbag 54 of the knee airbag module 114 inflates and deploys toward at least the front side of the knees N of the seated occupant P in the front seat 30 and the lower side of the protruding profile section 40, and the non-occupant-side base cloth portion 76F is configured so as to be disposed adjacent to the upright wall section 42 of the instrument panel 12 in the inflated and deployed state.

This modified example also configures a structure in which a position in the vehicle vertical direction of the protruding profile section 40 of the instrument panel 12 is set further toward a vehicle upper side than the knees N of the seated occupant P in the front seat 30, and enabling the knees N of the seated occupant P to be effectively protected in a head-on collision.

Further, the method of folding the knee airbag 54 of the modified example may be a folding method that includes a first process similar to the first process of the first exemplary embodiment, but, instead of the second process of the first exemplary embodiment, includes a process in which, after the first process, the knee airbag 54 is folded into a roll shape, from the lower edge side to the upper edge side, such that a side at which the left and right pair of folded portions 54A, 54B illustrated in FIG. 6B appear side-by-side is folded to be positioned at an inner side.

Thus folded, the knee airbag 54 deploys toward the lower side in the first half of inflation and deployment in a head-on collision, and then inflates and deploys so as to open out toward the left and right, such that the coupling cloth 56 illustrated in FIG. 3B is stretched in the left-right direction. Thus, similarly to in the first exemplary embodiment, even if the knees N of the seated occupant P were to abut the coupling cloth 56 before inflation and deployment of the knee airbag 54 illustrated in FIG. 1 is complete, since the coupling cloth 56 is not yet taut, any load acting on the knees N of the seated occupant P can be suppressed to a low amount before inflation and deployment of the knee airbag 54 is complete.

Second Exemplary Embodiment

Explanation follows regarding a vehicle knee airbag device according to a second exemplary embodiment of the present invention, with reference to FIG. 9. As illustrated in FIG. 9, in the vehicle knee airbag device 80 of the present exemplary embodiment, a knee airbag 84 is configured so as to have a height spanning from the lower face of the lower wall 40L of the protruding profile section 40 to the vehicle floor 24 in the inflated and deployed state.

Other configuration of the present exemplary embodiment is substantially the same as that of the first exemplary embodiment. Configuration that is substantially the same as configuration of the first exemplary embodiment is appended with the same reference numerals, and explanation thereof is omitted.

Similarly to in the first exemplary embodiment, the configuration of the present exemplary embodiment can also effectively protect the knees N of the seated occupant P in a head-on collision. Further, in the present exemplary embodiment, even when a lower portion of the upright wall section 42 of the instrument panel 12 moves back toward the vehicle rear due to collision load in a head-on collision as illustrated in FIG. 9B, the knee airbag 84 is interposed between the lower portion of the upright wall section 42 and the feet F of the seated occupant P in the front seat 30. This enables impact on the feet F of the seated occupant P to be softened compared to cases in which the lower portion of the upright wall section 42 pushes directly on the feet F of the seated occupant P in a head-on collision. Note that since the knee airbag 84 is recessed at a left-right direction intermediate portion 60 as viewed from the side of the seated occupant P (see FIG. 2), the feet F of the seated occupant P are suppressed from being pushed back by the knee airbag 84.

Modified Example of the Second Exemplary Embodiment

Note that in the second exemplary embodiment above, the knee airbag module 82 illustrated in FIG. 9A is installed at the vehicle front side of the upright wall section 42 of the instrument panel 12. However, in a modified example, a knee airbag module 182 is installed at a vehicle upper side of the lower wall 40L of the protruding profile section 40, as in the knee airbag module 182 illustrated by double-dotted dashed lines in FIG. 9A.

Configuration of this modified example is similar to that of the modified example of the first exemplary embodiment, except for that a knee airbag that is substantially the same as the knee airbag 84 is employed instead of the knee airbag 54 of the modified example of the first exemplary embodiment. The knee airbag in the present modified example has a similar structure to the knee airbag 84 except for that attachment holes for attaching the inflator 152 are formed penetrating a left-right direction central portion of the upper face panel instead of the left-right direction central portion of the back face panel. Such a modified example is able to achieve substantially the same operation and advantageous effects as the second exemplary embodiment.

Third Exemplary Embodiment

Figure 10:
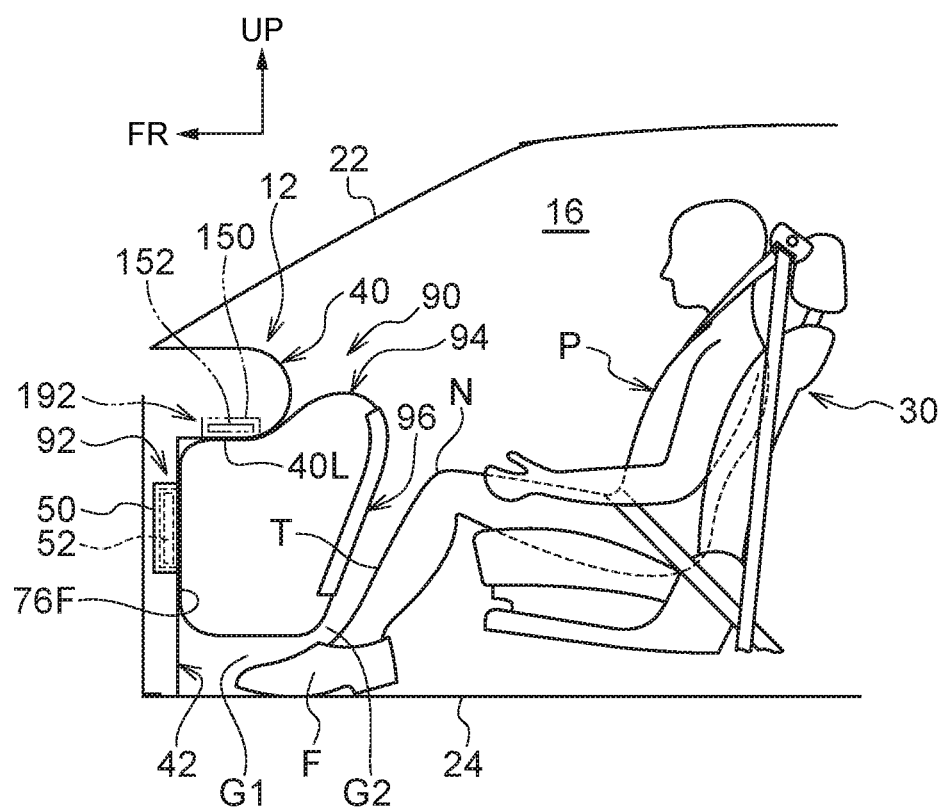
FIG. 10 is a side view illustrating an inflated and deployed state of a knee airbag of a vehicle knee airbag device according to a third exemplary embodiment of the present invention.
Figure 11:
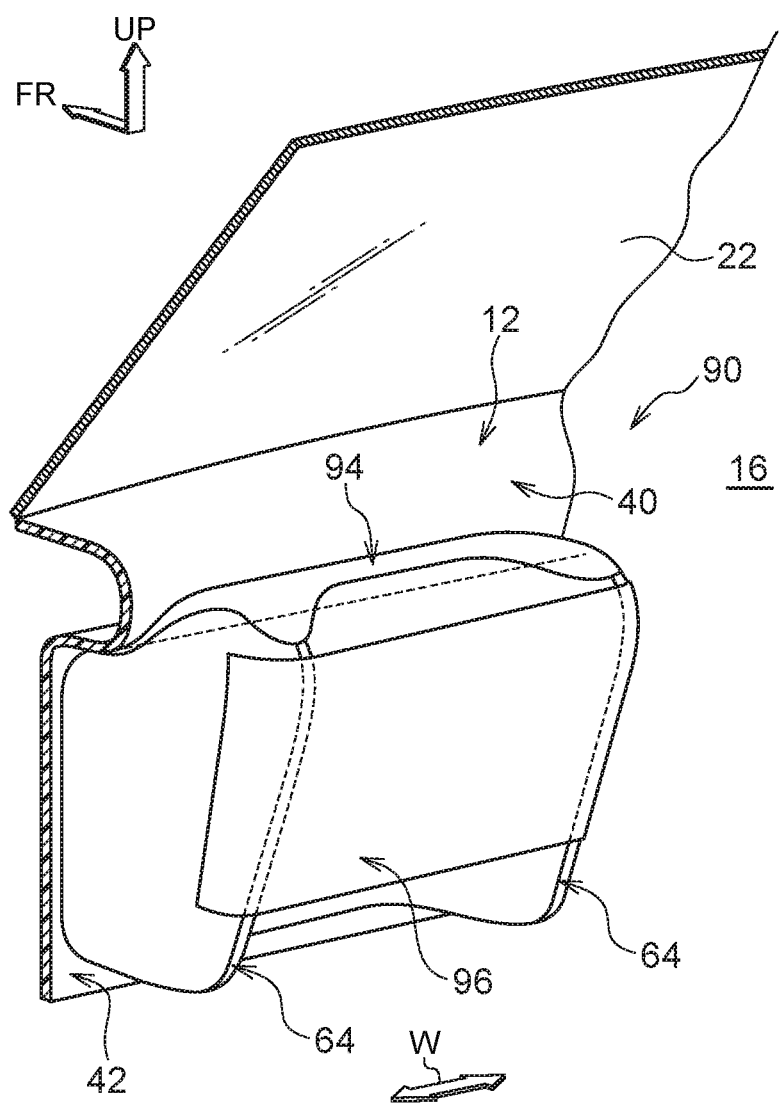
FIG. 11 is a perspective view illustrating an inflated and deployed state of a knee airbag of a vehicle knee airbag device according to the third exemplary embodiment.

Explanation follows regarding a vehicle knee airbag device according to a third exemplary embodiment of the present invention, with reference to FIG. 10 and FIG. 11. As illustrated in FIG. 10 and FIG. 11, in the vehicle knee airbag device 90 of the present exemplary embodiment, an upper end of a knee airbag 94 is configured so as to inflate and deploy at a vehicle rear side of the protruding profile section 40 of the instrument panel 12. Further, in the vehicle knee airbag device 90, in an inflated and deployed state of the knee airbag 94, a vehicle upper side location of the knee airbag 94 is configured so as to be disposed further toward a vehicle upper side than the lower wall 40L of the protruding profile section 40. An upper end of a coupling cloth 96 covers an upper end side of the knee airbag 94. The upper end of the coupling cloth 96 is configured so as to deploy to the vehicle rear side of the protruding profile section 40 of the instrument panel 12, and to the vehicle upper side of the lower wall 40L. As illustrated in FIG. 10, the coupling cloth 96 adopts a state stretched across a range encompassing a front side of the knees N of the seated occupant P in the front seat 30 and most of a front side of the shins T of the seated occupant P when the knee airbag 94 is inflated and deployed.

Other configuration of the present exemplary embodiment is substantially the same as that of the first exemplary embodiment. Configuration that is substantially the same as configuration in the first exemplary embodiment is appended with the same reference numerals, and explanation thereof is omitted.

Note that although omitted from the drawings, in the present exemplary embodiment, panels respectively shaped so as to substantially correspond to the outer profiles of the top, bottom, front, and rear of the knee airbag 94 illustrated in FIG. 10 and FIG. 11 are employed as panels corresponding to the upper face panel 70, the lower face panel 72, the front face panel 74, and the back face panel 76 respectively illustrated in FIG. 5. A method similar to that of the first exemplary embodiment (see FIG. 6) is employed as a folding method for the knee airbag 94.

Similarly to the first exemplary embodiment, the configuration of the present exemplary embodiment enables the knees N of the seated occupant P to be effectively protected in a head-on collision. Moreover, the configuration of the present exemplary embodiment enables the knees N of the seated occupant P to be caught by the coupling cloth 96 in a head-on collision even when, for example, the seated occupant P has crossed legs and the height position of the knees N of the seated occupant P is higher than normal position at which the seated occupant P does not have crossed legs. This enables impact to the knees N of the seated occupant P to be softened in a head-on collision, even in cases in which the height position of the knees N of the seated occupant P is higher than normal height position. Thus, for example, even if an occupant with a significantly larger build than the seated occupant P is sitting in the front seat 30, it is possible to soften impact to the knees of such an occupant.

Modified Example of the Third Exemplary Embodiment

Note that in the third exemplary embodiment, the knee airbag module 92 illustrated in FIG. 10 is installed at the vehicle front side of the upright wall section 42 of the instrument panel 12. However, in a modified example, a knee airbag module 192 is installed at a vehicle upper side of the lower wall 40L of the protruding profile section 40, as in the knee airbag module 192 illustrated by double-dotted dashed lines in FIG. 10.

Configuration for this modified example is similar to that of the modified example of the first exemplary embodiment, except for that a knee airbag that is substantially the same as the knee airbag 94 is employed instead of the knee airbag 54 of the modified example of the first exemplary embodiment. The knee airbag of the present modified example is substantially the same as the knee airbag 94 except for that attachment holes for attaching the inflator 152 are formed penetrating a left-right direction central portion of the upper face panel instead of the left-right direction central portion of the back face panel. Such a modified example is able to achieve substantially the same operation and advantageous effects as the third exemplary embodiment.

Supplementary Explanation of the Exemplary Embodiments

Note that in the first to the third exemplary embodiments and the respective modified examples, the knee airbags 54, 84, 94 include the bulging portions 64 and are provided with a coupling cloth 56, 96. However, for example, a configuration may be adopted in which a configuration portion corresponding to coupling cloth 56, 96 is not provided and in which a knee airbag does not include locations corresponding to the bulging portions 64.

Further, in the first to the third exemplary embodiments and the respective modified examples, the left and right cloth members 58 illustrated in FIG. 3B are arranged inside the knee airbag 54, 84, 94. However, in a modified example, a configuration may be adopted in which no such cloth members 58 are arranged therein. In another modified example, a configuration may be adopted in which plural left and right pairs of cloth members are arranged inside a knee airbag.

Further, although the coupling cloth 56 illustrated in FIG. 3B is configured such that its vehicle vertical direction position overlaps with that of the cloth members 58 in an inflated and deployed state of the knee airbag 54. In a modified example, a coupling cloth and cloth members are configured such that the vehicle vertical direction positions thereof are offset from each other in an inflated and deployed state of a knee airbag.

Further, in a modified example of the above exemplary embodiments, a vehicle vertical direction lower end of a knee airbag and a vehicle vertical direction lower end of a coupling cloth are configured to be at the same vehicle vertical direction position in an inflated and deployed state of a knee airbag.

Further, in a modified example of the above exemplary embodiments, the position of a vehicle vertical direction lower end of a coupling cloth (56, 96) may be configured to form a gap, into which the feet (F) of a seated occupant (P) in the front seat 30 cannot get in, between the vehicle vertical direction lower end of the coupling cloth (56, 96) and the vehicle floor (24) in an inflated and deployed state of a knee airbag (54, 84, 94).

The above exemplary embodiments are each configured with a knee airbag including an upper face panel, a lower face panel, a front face panel, and a back face panel. However, a knee airbag may, for example, have a configuration other than that described above, such as a configuration including an upper face panel, a lower face panel, and a peripheral face panel that links the upper face panel and the lower face panel together in the vertical direction.

Further, in the first and second exemplary embodiments, the coupling cloth 56 illustrated in FIG. 1 and FIG. 9A adopts a state stretched across the range encompassing the front side of the knees N of the seated occupant P in the front seat 30 and most of the front side of the shins T of the seated occupant P when the knee airbag 54, 84 is inflated and deployed. However, in a modified example, a coupling cloth may be configured in a state stretching only at a height position corresponding to the front side of the knees (N) of a seated occupant (P) when a knee airbag (54, 84) is inflated and deployed.

Further, in a modified example of the above exemplary embodiments, the protruding profile section 40 configuring the instrument panel may be separate from the upright wall section 42 provided at the vehicle front side of the protruding profile section 40 and at the vehicle lower side of the lower wall of the protruding profile section 40, and a lower wall side of the protruding profile section 40 may be joined to an upper end side of the upright wall section 42.

Note that various combinations of the above exemplary embodiments and above modified examples may be implemented as appropriate.

What is claimed is:

1. A vehicle knee airbag device comprising:
a protruding profile section disposed at a front section of a vehicle cabin and protruding toward a vehicle cabin inner side so as to configure an instrument panel, a position in a vehicle vertical direction of the protruding profile section being configured to be further toward a vehicle upper side than knees of a seated occupant in a front seat;
an upright wall section provided adjacent to a vehicle lower side of a lower wall of the protruding profile section, and extending in the vehicle vertical direction and a vehicle width direction; and
a knee airbag module installed at a vehicle front side of the upright wall section or at a vehicle upper side of the lower wall of the protruding profile section, and including a knee airbag which, on receipt of a supply of gas, is configured to inflate and deploy to at least a front side of the knees of the seated occupant and to a lower side of the protruding profile section, wherein:
the knee airbag includes a pair of bulging portions and a left-right direction intermediate portion, the pair of bulging portions in vehicle plan view configuring vehicle width direction left and right end sides of the knee airbag in an inflated and deployed state of the knee airbag and bulging out further toward a vehicle rear side than the left-right direction intermediate portion;
the pair of bulging portions (i) are inclined such that mutually opposing faces in the vehicle width direction of the pair of bulging portions approach one another on progression from respective bulge-leading-edge sides toward the vehicle front side and (ii) are configured to increase gradually in length in a vehicle front-rear direction toward the vehicle rear side on progression from a lower end side to an upper end side in vehicle side view such that bulge leading edges are inclined toward the vehicle rear side on progression toward the vehicle upper side;
the knee airbag includes a coupling cloth that couples together the bulge-leading-edge sides of the pair of bulging portions so as to adopt a state stretched across a range encompassing a position at the front side of the knees of the seated occupant in the front seat in the inflated and deployed state of the knee airbag; and
the knee airbag includes an occupant-side base cloth portion that is disposed on an occupant-facing side of the knee airbag in the inflated and deployed state and a non-occupant-side base cloth portion that is disposed on a non-occupant-facing side of the knee airbag in the inflated and deployed state, the non-occupant-side base cloth portion being disposed adjacent to the upright wall section in the inflated and deployed state of the knee airbag.

2. The vehicle knee airbag device of claim 1, wherein:
left and right cloth members are arranged inside the knee airbag, the cloth members coupling a vehicle width direction intermediate portion of the occupant-side base cloth portion to the non-occupant-side base cloth portion in vehicle plan view; and
in vehicle plan view, the cloth members adopt a stretched state extending inclined so as to move away from each other on progression toward the vehicle front side in the inflated and deployed state of the knee airbag.

3. The vehicle knee airbag device of claim 2, wherein:
a position in the vehicle vertical direction of the coupling cloth overlaps with a position in the vehicle vertical direction of the cloth members in the inflated and deployed state of the knee airbag.

4. The vehicle knee airbag device of claim 1, wherein:
a lower end in the vehicle vertical direction of the coupling cloth is disposed further toward the vehicle upper side than a lower end in the vehicle vertical direction of the knee airbag in the inflated and deployed state of the knee airbag.

5. The vehicle knee airbag device of claim 4, wherein:
the knee airbag is configured to form a gap, into which feet of the seated occupant in the front seat are able to enter, between the vehicle vertical direction lower end of the coupling cloth and a vehicle floor in the inflated and deployed state of the knee airbag.

6. The vehicle knee airbag device of claim 5, wherein:
the knee airbag is configured to form a gap, into which the feet of the seated occupant in the front seat are able to enter, between the vehicle vertical direction lower end of the knee airbag and the vehicle floor in the inflated and deployed state of the knee airbag.

7. The vehicle knee airbag device of claim 5, wherein:
the knee airbag is configured to not form a gap substantially between a lower face of the protruding profile section and the vehicle floor in the inflated and deployed state of the knee airbag.

8. The vehicle knee airbag device of claim 1, wherein:
an upper end of the knee airbag is configured to inflate and deploy to the vehicle rear side and the vehicle upper side of the lower wall of the protruding profile section; and an upper end of the coupling cloth is configured to deploy at the vehicle rear side and the vehicle upper side of the lower wall of the protruding profile section in the inflated and deployed state of the knee airbag.

9. A method of folding the knee airbag provided in the knee airbag module that is installed in the vehicle knee airbag device of claim 1, the knee airbag folding method comprising:

a first process in which, as viewed face-on from a position of the seated occupant, left and right end sides of the knee airbag are folded a plurality of times toward a knee airbag left-right direction center at fold lines running along a knee airbag vertical direction such that a side of the knee airbag that faces the seated occupant in the inflated and deployed state is positioned at an inner side of the folded knee airbag and a left and right pair of folded portions appear side-by-side at an outer side of the folded knee airbag; and a second process in which, after the first process, upper and lower end sides of the knee airbag are folded a plurality of times toward a knee airbag vertical direction center at fold lines running along a knee airbag left-right direction such that a side of the knee airbag at which the left and right pair of folded portions appear is positioned at an inner side of the folded knee airbag.

* * * * *